(12) United States Patent
Arnone et al.

(10) Patent No.: US 10,043,347 B2
(45) Date of Patent: *Aug. 7, 2018

(54) SYSTEMS AND METHODS FOR A HYBRID ENTERTAINMENT AND GAMBLING GAME USING AN OBJECT ALIGNMENT GAME

(71) Applicant: Gamblit Gaming, LLC, Glendale, CA (US)

(72) Inventors: Miles Arnone, Sherborn, MA (US); Caitlyn Ross, Watertown, MA (US)

(73) Assignee: Gamblit Gaming, LLC, Glendale, CA (US)

( * ) Notice: Subject to any disclaimer, the term of this patent is extended or adjusted under 35 U.S.C. 154(b) by 328 days.

This patent is subject to a terminal disclaimer.

(21) Appl. No.: 14/793,704

(22) Filed: Jul. 7, 2015

(65) Prior Publication Data
US 2015/0310702 A1    Oct. 29, 2015

Related U.S. Application Data

(63) Continuation of application No. PCT/US2013/003427, filed on Dec. 5, 2013.
(Continued)

(51) Int. Cl.
*G07F 17/32* (2006.01)
*G06F 21/55* (2013.01)

(52) U.S. Cl.
CPC ........ *G07F 17/326* (2013.01); *G07F 17/3232* (2013.01); *G07F 17/3241* (2013.01); *G07F 17/3262* (2013.01); *G07F 17/3295* (2013.01); *G06F 21/552* (2013.01); *G07F 17/3267* (2013.01)

(58) Field of Classification Search
CPC ............. G07F 17/3241; G07F 17/3295; G07F 17/326; G06F 21/552
See application file for complete search history.

(56) References Cited

U.S. PATENT DOCUMENTS 5,413,357 A    5/1995   Schulze et al.
5,718,429 A    2/1998   Keller
(Continued)

FOREIGN PATENT DOCUMENTS

WO    2007/035645 A2    3/2007

OTHER PUBLICATIONS

U.S. Appl. No. 14/205,303 Arnone, et al., filed Mar. 11, 2014.
(Continued)

*Primary Examiner* — William H McCulloch, Jr.
(74) *Attorney, Agent, or Firm* — Caitlyn Ross

(57) ABSTRACT

Systems and methods for a gambling hybrid game that provides an object alignment game in which a player moves an object in a displayed grid to form an alignment of a plurality of matching objects in a specified configuration as an entertainment game are disclosed. The entertainment engine provides the game in which a player moves a game object within the grid and determines the result of the movement. The entertainment engine generates status updates based on the game play of the object alignment game. The status of the game play is provided to a game world engine that determines when gambling events should be provided based on the status of game play and a real world engine resolves the gambling event and associated wagers.

21 Claims, 19 Drawing Sheets

Related U.S. Application Data

(60) Provisional application No. 61/749,506, filed on Jan. 7, 2013.

(56) References Cited

U.S. PATENT DOCUMENTS

| | | |
|---|---|---|
| 5,785,592 A | 7/1998 | Jacobsen |
| 5,853,324 A | 12/1998 | Kami et al. |
| 5,963,745 A | 10/1999 | Collins et al. |
| 6,050,895 A | 4/2000 | Luciano |
| 6,165,071 A | 12/2000 | Weiss |
| 6,227,974 B1 | 5/2001 | Eilat |
| 6,267,669 B1 | 7/2001 | Luciano |
| 6,685,563 B1 | 2/2004 | Meekins et al. |
| 6,712,693 B1 | 3/2004 | Hettinger |
| 6,761,632 B2 | 7/2004 | Bansemer et al. |
| 6,761,633 B2 | 7/2004 | Riendeau |
| 6,764,397 B1 | 7/2004 | Robb |
| 6,811,482 B2 | 11/2004 | Letovsky |
| 6,910,962 B2 * | 6/2005 | Marks ............... G07F 17/32 463/16 |
| 7,118,105 B2 | 10/2006 | Benevento |
| 7,294,058 B1 | 11/2007 | Slomiany |
| 7,326,115 B2 | 2/2008 | Baerlocher |
| 7,357,713 B2 * | 4/2008 | Marks ............... G07F 17/32 463/15 |
| 7,361,091 B2 | 4/2008 | Letovsky |
| 7,517,282 B1 | 4/2009 | Pryor |
| 7,575,517 B2 | 8/2009 | Parham et al. |
| 7,682,239 B2 | 3/2010 | Friedman et al. |
| 7,720,733 B2 | 5/2010 | Jung |
| 7,753,770 B2 | 7/2010 | Walker et al. |
| 7,753,790 B2 | 7/2010 | Nguyen |
| 7,766,742 B2 | 8/2010 | Bennett et al. |
| 7,775,885 B2 | 8/2010 | Van Luchene |
| 7,798,896 B2 | 9/2010 | Katz |
| 7,828,657 B2 | 11/2010 | Booth |
| 7,917,371 B2 | 3/2011 | Jung et al. |
| 7,938,727 B1 | 5/2011 | Konkle |
| 7,967,674 B2 | 6/2011 | Baerlocher |
| 7,980,948 B2 | 7/2011 | Rowe |
| 7,996,264 B2 | 8/2011 | Kusumoto et al. |
| 8,012,023 B2 | 9/2011 | Gates |
| 8,025,567 B2 * | 9/2011 | Kane ............... G07F 17/32 463/16 |
| 8,047,908 B2 | 11/2011 | Walker |
| 8,047,915 B2 | 11/2011 | Lyle |
| 8,060,829 B2 | 11/2011 | Jung et al. |
| 8,075,383 B2 | 12/2011 | Friedman et al. |
| 8,083,581 B2 * | 12/2011 | Marks ............... G07F 17/32 463/20 |
| 8,087,999 B2 | 1/2012 | Oberberger |
| 8,113,938 B2 | 2/2012 | Friedman et al. |
| 8,118,654 B1 | 2/2012 | Nicolas |
| 8,128,487 B2 | 3/2012 | Hamilton et al. |
| 8,135,648 B2 | 3/2012 | Oram |
| 8,137,193 B1 | 3/2012 | Kelly et al. |
| 8,142,272 B2 | 3/2012 | Walker |
| 8,157,653 B2 | 4/2012 | Buhr |
| 8,167,699 B2 | 5/2012 | Inamura |
| 8,177,628 B2 | 5/2012 | Manning |
| 8,182,338 B2 | 5/2012 | Thomas |
| 8,182,339 B2 | 5/2012 | Anderson |
| 8,187,068 B2 | 5/2012 | Slomiany |
| 8,206,210 B2 | 6/2012 | Walker |
| 8,308,544 B2 | 11/2012 | Friedman |
| 8,323,091 B2 * | 12/2012 | Frank ............... G07F 17/3244 463/16 |
| 8,435,111 B2 * | 5/2013 | Filipour ............... G07F 17/32 463/16 |
| 8,444,473 B2 * | 5/2013 | Ching ............... G07F 17/3267 463/16 |
| 8,475,266 B2 | 7/2013 | Arnone |
| 8,480,470 B2 | 7/2013 | Napolitano et al. |
| 8,485,882 B2 * | 7/2013 | Kane ............... G07F 17/32 463/16 |
| 8,561,178 B2 * | 10/2013 | Schluessler ............... G06F 21/53 360/251 |
| 8,622,809 B1 | 1/2014 | Arora et al. |
| 8,668,581 B2 * | 3/2014 | Arnone ............... G06F 21/552 463/23 |
| 8,715,068 B2 * | 5/2014 | Arnone ............... G07F 17/326 463/25 |
| 8,715,069 B2 * | 5/2014 | Arnone ............... G07F 17/3244 463/25 |
| 8,734,238 B2 * | 5/2014 | Arnone ............... G07F 17/3241 463/16 |
| 8,758,122 B2 * | 6/2014 | Arnone ............... G06Q 50/34 463/16 |
| 8,821,270 B2 * | 9/2014 | Arnone ............... G06F 21/552 463/23 |
| 8,905,840 B2 * | 12/2014 | Arnone ............... G07F 17/3244 463/25 |
| 8,951,113 B2 * | 2/2015 | Arnone ............... G07F 17/3251 463/22 |
| 8,986,117 B2 * | 3/2015 | Arnone ............... G06F 21/552 463/23 |
| 8,998,707 B2 * | 4/2015 | Arnone ............... G07F 17/32 463/25 |
| 9,177,435 B2 * | 11/2015 | Arnone ............... G06F 21/552 |
| 9,251,657 B2 * | 2/2016 | Arnone ............... A63F 9/24 |
| 9,384,623 B2 * | 7/2016 | Arnone ............... G07F 17/32 |
| 9,430,902 B2 * | 8/2016 | Arnone ............... G07F 17/3272 |
| 9,483,165 B2 * | 11/2016 | Arnone ............... G07F 17/32 |
| 9,530,281 B2 * | 12/2016 | Basallo ............... G07F 17/3262 |
| 9,542,808 B2 * | 1/2017 | Marks ............... G07F 17/32 |
| 9,564,015 B2 * | 2/2017 | Arnone ............... G07F 17/3244 |
| 9,881,451 B2 * | 1/2018 | Arnone ............... G07F 17/3237 |
| 2001/0004609 A1 | 6/2001 | Walker et al. |
| 2001/0019965 A1 | 9/2001 | Ochi |
| 2002/0022509 A1 | 2/2002 | Nicastro et al. |
| 2002/0090990 A1 | 7/2002 | Joshi et al. |
| 2002/0175471 A1 | 11/2002 | Faith |
| 2003/0060286 A1 | 3/2003 | Walker et al. |
| 2003/0119576 A1 | 6/2003 | McClintic et al. |
| 2003/0139214 A1 | 7/2003 | Wolf et al. |
| 2003/0157981 A1 * | 8/2003 | Marks ............... G07F 17/32 463/20 |
| 2003/0171149 A1 | 9/2003 | Rothschild |
| 2003/0204565 A1 | 10/2003 | Guo et al. |
| 2003/0211879 A1 | 11/2003 | Englman |
| 2004/0092313 A1 | 5/2004 | Saito et al. |
| 2004/0097610 A1 | 5/2004 | Saito |
| 2004/0102238 A1 | 5/2004 | Taylor |
| 2004/0121839 A1 | 6/2004 | Webb |
| 2004/0127276 A1 * | 7/2004 | Moody ............... G07F 17/32 463/13 |
| 2004/0225387 A1 | 11/2004 | Smith |
| 2005/0003878 A1 | 1/2005 | Updike |
| 2005/0096124 A1 | 5/2005 | Stronach |
| 2005/0116411 A1 | 6/2005 | Herrmann et al. |
| 2005/0192087 A1 | 9/2005 | Friedman et al. |
| 2005/0233791 A1 | 10/2005 | Kane |
| 2005/0233806 A1 | 10/2005 | Kane et al. |
| 2005/0239538 A1 | 10/2005 | Dixon |
| 2005/0269778 A1 | 12/2005 | Samberg |
| 2005/0288101 A1 | 12/2005 | Lockton et al. |
| 2006/0003823 A1 | 1/2006 | Zhang |
| 2006/0003830 A1 | 1/2006 | Walker et al. |
| 2006/0035696 A1 | 2/2006 | Walker |
| 2006/0040735 A1 | 2/2006 | Baerlocher |
| 2006/0068913 A1 | 3/2006 | Walker et al. |
| 2006/0084499 A1 | 4/2006 | Moshal |
| 2006/0084505 A1 | 4/2006 | Yoseloff |
| 2006/0135250 A1 | 6/2006 | Rossides |
| 2006/0154710 A1 | 7/2006 | Serafat |
| 2006/0166729 A1 | 7/2006 | Saffari et al. |
| 2006/0189371 A1 | 8/2006 | Walker et al. |
| 2006/0223611 A1 | 10/2006 | Baerlocher |
| 2006/0234791 A1 | 10/2006 | Nguyen et al. |
| 2006/0240890 A1 | 10/2006 | Walker |
| 2006/0246403 A1 | 11/2006 | Monpouet et al. |

(56) References Cited

U.S. PATENT DOCUMENTS

| | | |
|---|---|---|
| 2006/0258433 A1 | 11/2006 | Finocchio et al. |
| 2007/0026924 A1 | 2/2007 | Taylor |
| 2007/0035548 A1 | 2/2007 | Jung et al. |
| 2007/0038559 A1 | 2/2007 | Jung et al. |
| 2007/0064074 A1 | 3/2007 | Silverbrook et al. |
| 2007/0087799 A1 | 4/2007 | Van Luchene |
| 2007/0093299 A1 | 4/2007 | Bergeron |
| 2007/0099696 A1 | 5/2007 | Nguyen et al. |
| 2007/0117641 A1 | 5/2007 | Walker et al. |
| 2007/0129149 A1 | 6/2007 | Walker |
| 2007/0142108 A1 | 6/2007 | Linard |
| 2007/0156509 A1 | 7/2007 | Jung et al. |
| 2007/0167212 A1 | 7/2007 | Nguyen |
| 2007/0167239 A1 | 7/2007 | O'Rourke |
| 2007/0173311 A1 | 7/2007 | Morrow et al. |
| 2007/0191104 A1 | 8/2007 | Van Luchene |
| 2007/0202941 A1 | 8/2007 | Miltenberger |
| 2007/0203828 A1 | 8/2007 | Jung et al. |
| 2007/0207847 A1 | 9/2007 | Thomas |
| 2007/0259717 A1 | 11/2007 | Mattice |
| 2007/0293306 A1 | 12/2007 | Nee et al. |
| 2008/0004107 A1 | 1/2008 | Nguyen et al. |
| 2008/0014835 A1 | 1/2008 | Weston et al. |
| 2008/0015004 A1 | 1/2008 | Gatto et al. |
| 2008/0064488 A1 | 3/2008 | Oh |
| 2008/0070659 A1 | 3/2008 | Naicker |
| 2008/0070690 A1 | 3/2008 | Van Luchene |
| 2008/0070702 A1 | 3/2008 | Kaminkow |
| 2008/0096665 A1 | 4/2008 | Cohen |
| 2008/0108406 A1 | 5/2008 | Oberberger |
| 2008/0108425 A1 | 5/2008 | Oberberger |
| 2008/0113704 A1 | 5/2008 | Jackson |
| 2008/0119283 A1 | 5/2008 | Baerlocher |
| 2008/0146308 A1 | 6/2008 | Okada |
| 2008/0161081 A1 | 7/2008 | Berman |
| 2008/0176619 A1 | 7/2008 | Kelly |
| 2008/0191418 A1 | 8/2008 | Lutnick et al. |
| 2008/0195481 A1 | 8/2008 | Lutnick |
| 2008/0248850 A1 | 10/2008 | Schugar |
| 2008/0254893 A1 | 10/2008 | Patel |
| 2008/0274796 A1 | 11/2008 | Lube |
| 2008/0274798 A1 | 11/2008 | Walker et al. |
| 2008/0311980 A1 | 12/2008 | Cannon |
| 2008/0318668 A1 | 12/2008 | Ching |
| 2009/0011827 A1 | 1/2009 | Englman |
| 2009/0023489 A1 | 1/2009 | Toneguzzo |
| 2009/0023492 A1 | 1/2009 | Erfanian |
| 2009/0061974 A1 | 3/2009 | Lutnick et al. |
| 2009/0061975 A1 | 3/2009 | Ditchev |
| 2009/0061991 A1 | 3/2009 | Popovich |
| 2009/0061997 A1 | 3/2009 | Popovich |
| 2009/0061998 A1 | 3/2009 | Popovich |
| 2009/0061999 A1 | 3/2009 | Popovich |
| 2009/0082093 A1 | 3/2009 | Okada |
| 2009/0088239 A1 | 4/2009 | Iddings |
| 2009/0098934 A1 | 4/2009 | Amour |
| 2009/0118006 A1 | 5/2009 | Kelly et al. |
| 2009/0124344 A1 | 5/2009 | Mitchell et al. |
| 2009/0131158 A1 | 5/2009 | Brunet De Courssou et al. |
| 2009/0131175 A1 | 5/2009 | Kelly et al. |
| 2009/0143141 A1 | 6/2009 | Wells |
| 2009/0149233 A1 | 6/2009 | Strause et al. |
| 2009/0156297 A1 | 6/2009 | Andersson et al. |
| 2009/0176560 A1 | 7/2009 | Herrmann et al. |
| 2009/0176566 A1 | 7/2009 | Kelly |
| 2009/0181777 A1 | 7/2009 | Christiani |
| 2009/0221355 A1 | 9/2009 | Dunaevsky et al. |
| 2009/0239610 A1 | 9/2009 | Olive |
| 2009/0247272 A1 | 10/2009 | Abe |
| 2009/0270164 A1 | 10/2009 | Seelig |
| 2009/0275393 A1 | 11/2009 | Kisenwether |
| 2009/0291755 A1 | 11/2009 | Walker et al. |
| 2009/0309305 A1 | 12/2009 | May |
| 2009/0312093 A1 | 12/2009 | Walker et al. |
| 2009/0325686 A1 | 12/2009 | Davis |
| 2010/0004058 A1 | 1/2010 | Acres |
| 2010/0016056 A1 | 1/2010 | Thomas et al. |
| 2010/0029373 A1 | 2/2010 | Graham et al. |
| 2010/0035674 A1 | 2/2010 | Slomiany |
| 2010/0056247 A1 | 3/2010 | Nicely |
| 2010/0056260 A1 | 3/2010 | Fujimoto |
| 2010/0062836 A1 | 3/2010 | Young |
| 2010/0093420 A1 | 4/2010 | Wright |
| 2010/0093444 A1 | 4/2010 | Biggar et al. |
| 2010/0105454 A1 | 4/2010 | Weber |
| 2010/0120525 A1 | 5/2010 | Baerlocher et al. |
| 2010/0124983 A1 | 5/2010 | Gowin et al. |
| 2010/0137047 A1 | 6/2010 | Englman et al. |
| 2010/0174593 A1 | 7/2010 | Cao |
| 2010/0184509 A1 | 7/2010 | Sylla et al. |
| 2010/0203940 A1 | 8/2010 | Alderucci et al. |
| 2010/0210344 A1 | 8/2010 | Edidin et al. |
| 2010/0227672 A1 | 9/2010 | Amour |
| 2010/0227688 A1 | 9/2010 | Lee |
| 2010/0240436 A1 | 9/2010 | Wilson et al. |
| 2010/0304825 A1 | 12/2010 | Davis |
| 2010/0304839 A1 | 12/2010 | Johnson |
| 2010/0304842 A1 | 12/2010 | Friedman et al. |
| 2011/0009177 A1 | 1/2011 | Katz |
| 2011/0009178 A1 | 1/2011 | Gerson |
| 2011/0045896 A1 | 2/2011 | Sak et al. |
| 2011/0077087 A1 | 3/2011 | Walker et al. |
| 2011/0082571 A1 | 4/2011 | Murdock et al. |
| 2011/0105206 A1 | 5/2011 | Rowe et al. |
| 2011/0107239 A1 | 5/2011 | Adoni |
| 2011/0109454 A1 | 5/2011 | McSheffrey |
| 2011/0111820 A1 | 5/2011 | Filipour |
| 2011/0111837 A1 | 5/2011 | Gagner |
| 2011/0111841 A1 | 5/2011 | Tessmer |
| 2011/0118011 A1 | 5/2011 | Filipour et al. |
| 2011/0201413 A1 | 8/2011 | Oberberger |
| 2011/0207523 A1 | 8/2011 | Filipour et al. |
| 2011/0212766 A1 | 9/2011 | Bowers |
| 2011/0212767 A1 | 9/2011 | Barclay |
| 2011/0218028 A1 | 9/2011 | Acres |
| 2011/0218035 A1 | 9/2011 | Thomas |
| 2011/0230258 A1 | 9/2011 | Van Luchene |
| 2011/0230260 A1 | 9/2011 | Morrow et al. |
| 2011/0230267 A1 | 9/2011 | Van Luchene |
| 2011/0244944 A1 | 10/2011 | Baerlocher |
| 2011/0263312 A1 | 10/2011 | De Waal |
| 2011/0269522 A1 | 11/2011 | Nicely et al. |
| 2011/0275440 A1 | 11/2011 | Faktor |
| 2011/0287828 A1 | 11/2011 | Anderson et al. |
| 2011/0287841 A1 | 11/2011 | Watanabe |
| 2011/0312408 A1 | 12/2011 | Okuaki |
| 2011/0319169 A1 | 12/2011 | Lam |
| 2012/0004747 A1 | 1/2012 | Kelly |
| 2012/0028718 A1 | 2/2012 | Barclay et al. |
| 2012/0058814 A1 | 3/2012 | Lutnick |
| 2012/0077569 A1 | 3/2012 | Watkins |
| 2012/0108323 A1 | 5/2012 | Kelly |
| 2012/0135793 A1 | 5/2012 | Antonopoulos |
| 2012/0202587 A1 | 8/2012 | Allen |
| 2012/0208623 A1* | 8/2012 | Friedman ............ G07F 17/3295 463/25 |
| 2012/0302311 A1 | 11/2012 | Luciano |
| 2012/0322545 A1 | 12/2012 | Arnone et al. |
| 2013/0029760 A1 | 1/2013 | Wickett |
| 2013/0131848 A1 | 5/2013 | Arnone et al. |
| 2013/0190074 A1 | 7/2013 | Arnone et al. |
| 2013/0244764 A1* | 9/2013 | Arnone ................ G07F 17/32 463/25 |
| 2013/0244765 A1* | 9/2013 | Arnone ............... G07F 17/3225 463/25 |
| 2013/0252687 A1* | 9/2013 | Arnone ............... G07F 17/3258 463/16 |
| 2013/0260869 A1 | 10/2013 | Leandro et al. |
| 2014/0087801 A1 | 3/2014 | Nicely et al. |
| 2014/0087808 A1 | 3/2014 | Leandro et al. |
| 2014/0087809 A1 | 3/2014 | Leupp et al. |
| 2014/0155147 A1* | 6/2014 | Arnone ............... G07F 17/3269 463/25 |

(56) References Cited

U.S. PATENT DOCUMENTS

| | | | | |
|---|---|---|---|---|
| 2014/0200074 A1* | 7/2014 | Arnone | ............... | G07F 17/3244 463/25 |
| 2014/0323211 A1* | 10/2014 | Arnone | ............... | G07F 17/326 463/25 |
| 2015/0317874 A1* | 11/2015 | Arnone | ............... | G07F 17/32 463/16 |
| 2016/0019756 A1* | 1/2016 | Arnone | ............... | G07F 17/3262 463/25 |
| 2017/0116816 A1* | 4/2017 | Marks | ............... | G07F 17/3211 |
| 2017/0116821 A1* | 4/2017 | Marks | ............... | G07F 17/3244 |
| 2017/0124812 A1* | 5/2017 | Washington | ............... | G07F 17/3295 |
| 2017/0178454 A1* | 6/2017 | Arnone | ............... | G07F 17/3267 |
| 2017/0186280 A1* | 6/2017 | Arnone | ............... | G07F 17/3295 |

OTHER PUBLICATIONS

U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.

(56) References Cited

OTHER PUBLICATIONS

U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
International Search Report and Written Opinion, PCT/US2013/73427, dated Apr. 18, 2014.

* cited by examiner

SYSTEMS AND METHODS FOR A HYBRID ENTERTAINMENT AND GAMBLING GAME USING AN OBJECT ALIGNMENT GAME

CROSS-REFERENCE TO RELATED APPLICATIONS

The current application is a continuation of Patent Cooperation Treaty Application No. PCT/US13/73427, filed Dec. 5, 2013 which claims the benefit of U.S. Provisional Application No. 61/749,506, filed Jan. 7, 2013, the disclosure of which is incorporated herein by reference as if set forth herewith.

FIELD OF THE INVENTION

Embodiments of the present invention are generally related to gaming and more specifically to systems and processes that provide a gambling hybrid game in which an object alignment game is provided as an entertainment game and gambling events are triggered by game events during play of the object alignment game.

BACKGROUND

The gaming machine manufacturing industry provides a variety of gaming machines to enable wagering for interested parties whilst providing an entertainment experience. An exemplary gaming machine is a slot machine. As the demographic of eligible players has shifted with time to newer generations who have grown accustomed to highly sophisticated graphics and interactive video games, a need has arisen to increase the entertainment content present on a gaming machine to keep it relevant, at least to a growing portion of a casino's patronage. The subject design is a form of gaming machine, designed for use in a physical or virtual casino environment, which provides players an environment in which to play for cash, prizes and points, either against the casino or in head to head modes in a controlled and regulated manner while being allowed to use their skills and adeptness at a particular type of game. An example of such a game would be a challenging word spelling game, or an interactive action game such as is found on video game consoles popular today, such as a PlayStation®, an Xbox®, a Wii® or a PC based.

SUMMARY OF THE INVENTION

Systems and methods in accordance with embodiments of the invention provide a gambling hybrid game on a computing device with an object alignment game as the entertainment game. In an object alignment game, a player a player aligns matching objects in rows and/or columns containing different objects. In accordance with embodiments of the invention, the gambling hybrid game includes an entertainment engine, a game world engine, and a real world engine. The entertainment engine is constructed to execute an entertainment game. The game world engine is constructed to manage the entertainment game and the real world engine is constructed to resolve gambling events in the gambling hybrid game. In accordance with some of these embodiments, a gambling hybrid game having an object alignment game as the entertainment game is provided in the following manner. The entertainment engine receives an input from the player movement of an object within a displayed grid in the entertainment game. The entertainment engine determines a result of the movement of the game object in the entertainment game and generates status updates regarding play of the object alignment game.

The status updates of the play of the object alignment game are provided by the entertainment engine to the game world engine. The game world engine determines whether a gambling event is to occur based upon the status update from the entertainment engine and requests the gambling event be resolved by the real world engine when the gambling event occurs. The real world engine determines a result of the gambling event and a wager associated with the gambling event.

In accordance with some embodiments of the invention, the game world engine receives the result of the gambling event from the real world engine and determines an amount of an intermediate value item to award the player based on the result of the gambling event using the game world engine. In accordance with some of these embodiments, the game world engine uses the status update along with the result of the gambling event to determine the amount of an intermediate value item to award. In accordance with still further of these embodiments, the game world engine provides an indeterminate game resource that a player may acquire with the intermediate value item using the game world engine. The game world engine also receives a request from the player to acquire the indeterminate game resource in the game world engine. In response to the request, the game world engine deducts the amount of the intermediate value item from an intermediate value item account of the player and provides an update of the indeterminate game resource from the game world engine to the entertainment engine for use in the game.

In accordance with some embodiments of the invention, the game world engine receives the result of the gambling event from the real world engine and determines an amount of game world currency to provide to the player based on the result of gambling event. In accordance with some of these embodiments, the game world engine provides an indeterminate game resource that a player may acquire with the intermediate value item from the game world engine. The game world engine receives a request from the player to acquire the indeterminate game resource. In response to the request, the game world engine deducts the amount of the intermediate value item from an intermediate value item account of the player and provides an update of the indeterminate game resource to the entertainment engine for use in the object alignment game.

DETAILED DISCLOSURE OF THE INVENTION

Turning now to the drawings, systems and methods for providing an object alignment game as an entertainment game of a gambling hybrid game in accordance with some embodiments of the invention are illustrated. In accordance with many embodiments of the invention, a gambling hybrid game (HyG) provides an object alignment game as an entertainment game that allows players the opportunity to play the object alignment game, with the addition of a gambling element based on game play. In accordance with embodiments of the invention, an object alignment game is a puzzle game in which a player aligns matching objects in rows and/or columns containing different objects. The gambling hybrid game also provides a gambling game in which the outcomes of a gambling event and associated wagers are determined solely on the outcome of an RNG based gaming module. In accordance with many of these embodiments, the gambling hybrid game offers an enriched gaming experience, based on game play of the object alignment game provided by an entertainment engine which through the game world engine (GWE) of the gambling hybrid game triggers real world gambling events via the real world engine (RWE).

Hybrid Gaming Systems

Figure 1:
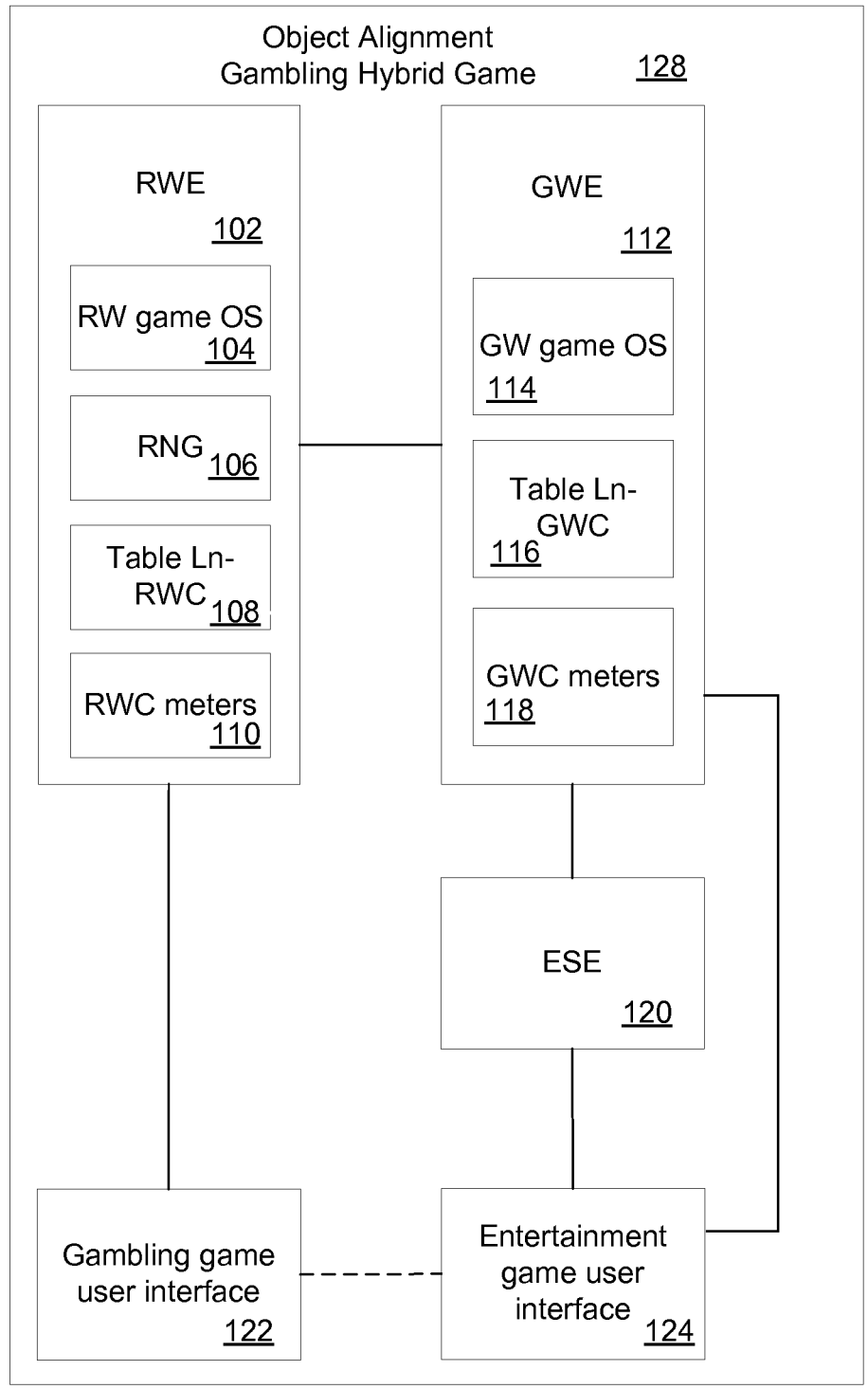
FIG. 1 illustrates a conceptual diagram of components of a gambling hybrid game in accordance with an embodiment of the invention.

In accordance with many embodiments of the invention, a gambling hybrid game integrates high-levels of entertainment content with a game of skill (entertainment game) and a gambling experience with a game of chance (gambling game). A gambling hybrid game provides for random outcomes independent of player skill while providing that the user's gaming experience (as measured by obstacles/challenges encountered, time of play and other factors) is shaped by the player's skill. The outcome of a gambling proposition that is determined by a Random Number Generator (RNG) or other such device that provides a random outcome in response to a request. In accordance with some embodiments, the wager game may be initiated in response to a game object related player action. A gambling hybrid game in accordance with an embodiment of the invention is illustrated in FIG. 1. The gambling hybrid game 128 includes a Real World Engine (RWE) 102, a Game World Engine (GWE) 112, an Entertainment System Engine (ESE) 120, a gambling game user interface 122 and an entertainment game user interface 124. The two user interfaces can be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In accordance with several embodiments, the RWE 102 is the operating system for the gambling game of the gambling hybrid game 128 and controls and operates the gambling game. The operation of a gambling game is enabled by Real World Currency (RC), such as money or other real world funds. A gambling game can increase or decrease an amount of RC based on random gambling outcomes, where the gambling proposition of a gambling game is typically regulated by gaming control bodies. In many embodiments, the RWE includes a Real World (RW) operating system (OS) 104, RNG 106, level n real-world credit pay tables (table Ln-RC) 108, RC meters 110 and other software constructs that enable a game of chance to offer a fair and transparent gambling proposition, and to contain the auditable systems and functions that can enable the game to obtain gaming regulatory body approval.

A random number generator (RNG) 106 includes software and/or hardware algorithms and/or processes, which are used to generate random outcomes. A level n real-world credit pay table (table Ln-RC) 108 is a table that can be used in conjunction with a random number generator (RNG) 106 to dictate the RC earned as a function of sponsored gameplay and is analogous to the pay tables used in a conventional slot machine. Table Ln-RC payouts are independent of player skill. There can be one table or multiple tables included in Ln-RC pay tables 108 contained in a gambling game, the selection of which can be determined by factors including (but not limited to) game progress that a player has earned, and/or bonus rounds for which a player can be eligible. RCs are credits analogous to slot machine game credits, which are entered into a gambling game by the user, either in the form of money such as hard currency or electronic funds. RCs can be decremented or augmented based on the outcome of a random number generator according to the table Ln-RC real world credits pay table 108, independent of player skill. In certain embodiments, an amount of RC can be used as criteria in order to enter higher ESE game levels. RC can be carried forward to higher game levels or paid out if a cash out is opted for by a player. The amount of RC used to enter a specific level of the game level n need not be the same for each level.

In accordance with some embodiments of the invention, the GWE 112 manages the overall gambling hybrid game operation, with the RWE 102 and the ESE 120 effectively being support units to the GWE 112. In accordance with some of these embodiments, the GWE 112 contains mechanical, electronic, and software systems for an entertainment game. The GWE 112 includes an operating system (OS) 114 that provides control of the entertainment game. The GWE additionally contains a level n game world credit pay table (table Ln-GWC) 116 from where to take input from this table to affect the play of the entertainment game. The GWE 112 can further couple to the RWE 102 to determine the amount of RC available on the game and other metrics of wagering on the gambling game (and potentially affect the amount of RC in play on the RWE). The GWE additionally contains various audit logs and activity meters (such as the GWC meter) 118. The GWE 112 can also couple to a centralized server for exchanging various data related to the player and their activities on the game. The GWE 112 furthermore couples to the ESE 120.

In accordance with some embodiments, a level n game world credit pay table (Table Ln-GWC) 116 dictates the Game World Credit (GWC) earned as a function of player skill in the nth level of the game. The payouts governed by this table are dependent upon player skill and sponsored gameplay at large and can or cannot be coupled to a RNG. In accordance with some embodiments, GWCs are player points earned or depleted as a function of player skill, specifically as a function of player performance in the context of the game. GWC is analogous to the score in a typical video game. Each entertainment game has one or more scoring criterion, embedded within the table Ln-GWC 116 that reflects player performance against the goal(s) of the game. GWCs can be carried forward from one level of sponsored gameplay to another, and ultimately paid out in various manners such as directly in cash, or indirectly such as by earning entrance into a sweepstakes drawing, or earning participation in, or victory in, a tournament with prizes. GWCs can be stored on a player tracking card or in a network-based player tracking system, where the GWCs are attributed to a specific player.

In accordance with certain embodiments, the operation of the GWE does not affect the RWE's gambling operation except for player choice parameters that are allowable in slot machines, including but not limited to, wager terms such as, but not limited to, a wager amount, how fast the player wants to play (by pressing a button or pulling the handle of a slot machine), and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RC available in the gambling game. The communication link can also convey a status operation of the RWE (such as on-line or tilt). The communication link can further communicate the various gambling control factors which the RWE 102 uses as input, such as the number of RC consumed per game or the player's election to enter a jackpot round. In FIG. 1, the GWE 112 is also shown as connecting to the players user interface directly, as this can be utilized to communicate certain entertainment game club points, player status, control the selection of choices and messages which a player can find useful in order to adjust the entertainment game experience or understand their gambling status in the RWE 102.

In accordance with various embodiments of the invention, the ESE 120 manages and controls the visual, audio, and player control for the entertainment game. In accordance with certain embodiments, the ESE 120 accepts input from a player through a set of hand controls, and/or head, gesture, and/or eye tracking systems and outputs video, audio and/or other sensory output to a user interface. In accordance with many embodiments, the ESE 120 can exchange data with and accept control information from the GWE 112. In accordance with some of these embodiments, an ESE 120 can be implemented using a personal computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In accordance with some of these embodiments, ESE 120 can be an electromechanical game system of a draw certificate based gambling hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

The ESE 120 operates mostly independently from the GWE 112, except that via the interface, the GWE 112 can send certain entertainment game control parameters and elements to the ESE 120 to affect its play, such as (but not limited to) what level of character to be using, changing the difficulty level of the game, changing the type of gun or car in use, and/or requesting portions to become available or to be found by the character. These game control parameters and elements can be based on a gambling outcome of a gambling game that was triggered by an element in the entertainment game being acted upon by the player. The ESE 120 can accept this input from the GWE 112, make adjustments, and continue entertainment game gameplay all the while running seamlessly from the players perspective. The ESE's operation is mostly skill based, except for where the ESE's processes can inject complexities into the game by chance in its normal operation to create unpredictability in the entertainment game. Utilizing this interface, the ESE 120 can also communicate player choices made in the game to the GWE 112, such as but not limited to selection of a different gun, and/or the player picking up a special portion in the GW environment. The GWE's function in this architecture, being interfaced with the ESE 120, is to allow the transparent coupling of entertainment software to a fair and transparent random chance gambling game, providing a seamless perspective to the player that they are playing a typical popular entertainment game (which is skill based). In accordance with certain embodiments, the ESE 120 can be used to enable a wide range of entertainment games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In accordance with some embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RC in play, and amount of RC available. The RWE 102 can accept modifications in the amount of RC wagered on each individual gambling try, or the number of gambling games per minute the RWE 102 can execute, entrance into a bonus round, and other factors, all the while these factors can take a different form than that of a typical slot machine. An example of a varying wager amount that the player can choose can include, but is not limited to, gameplay with a more powerful character, a more powerful gun, or a better car. These choices can increase or decrease the amount wagered per individual gambling game, in the same manner that a standard slot machine player can decide to wager more or less credits for each pull of the handle. In accordance with some of these embodiments, the RWE 102 can communicate a number of factors back and forth to the GWE 112, via an interface, such increase/decrease in wager being a function of the player's decision making as to their operational profile in the entertainment game (such as but not limited to the power of the character, gun selection or car choice). In this manner, the player is always in control of the per game wager amount, with the choice mapping to some parameter or component that is applicable to the entertainment game experience of the hybrid game. In accordance with a particular embodiment, the RWE 102 operation can be a game of chance as a gambling game running every 10 seconds where the amount wagered is communicated from the GWE 112 as a function of choices the player makes in the operation profile in the entertainment game.

In many embodiments, a gambling hybrid game integrates a video game style gambling machine, where the gambling game (including an RWE 102 and RC) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time, a rich environment of rewards to stimulate gamers can be established with the entertainment game. In accordance with some of these embodiments, the gambling hybrid game can leverage very popular titles with garners and provides a sea change environment for casinos to attract players with games that are more akin to the type of entertainment that a younger generation desires. In accordance with various embodiments, players can use their skill towards building and banking GWC that in turn can be used to win tournaments and various prizes as a function of their gamer prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In accordance with some embodiments, gambling hybrid games also allow players to gain entry into subsequent competitions through the accumulation of game world credits (GWC) as a function of the user's demonstrated skill at the game. These competitions can pit individual players or groups of players against one another and/or against the casino to win prizes based upon a combination of chance and skill. These competitions can be either asynchronous events, whereby players participate at a time and/or place of their choosing, or they can be synchronized events, whereby players participate at a specific time and/or venue.

In accordance with some embodiments, one or more players engage in playing an entertainment game, resident in the ESE, the outcomes of which are dependent at least in part on skill. The gambling hybrid game can include an entertainment game that includes head to head play between a single player and the computer, between two or more players against one another, or multiple players playing against the computer and/or each other, as well as the process by which players bet on the outcome of the entertainment game. The entertainment game can also be a game where the player is not playing against the computer or any other player, such as in games where the player is effectively playing against himself or herself (such as but not limited to Solitaire and Babette).

Figure 2:
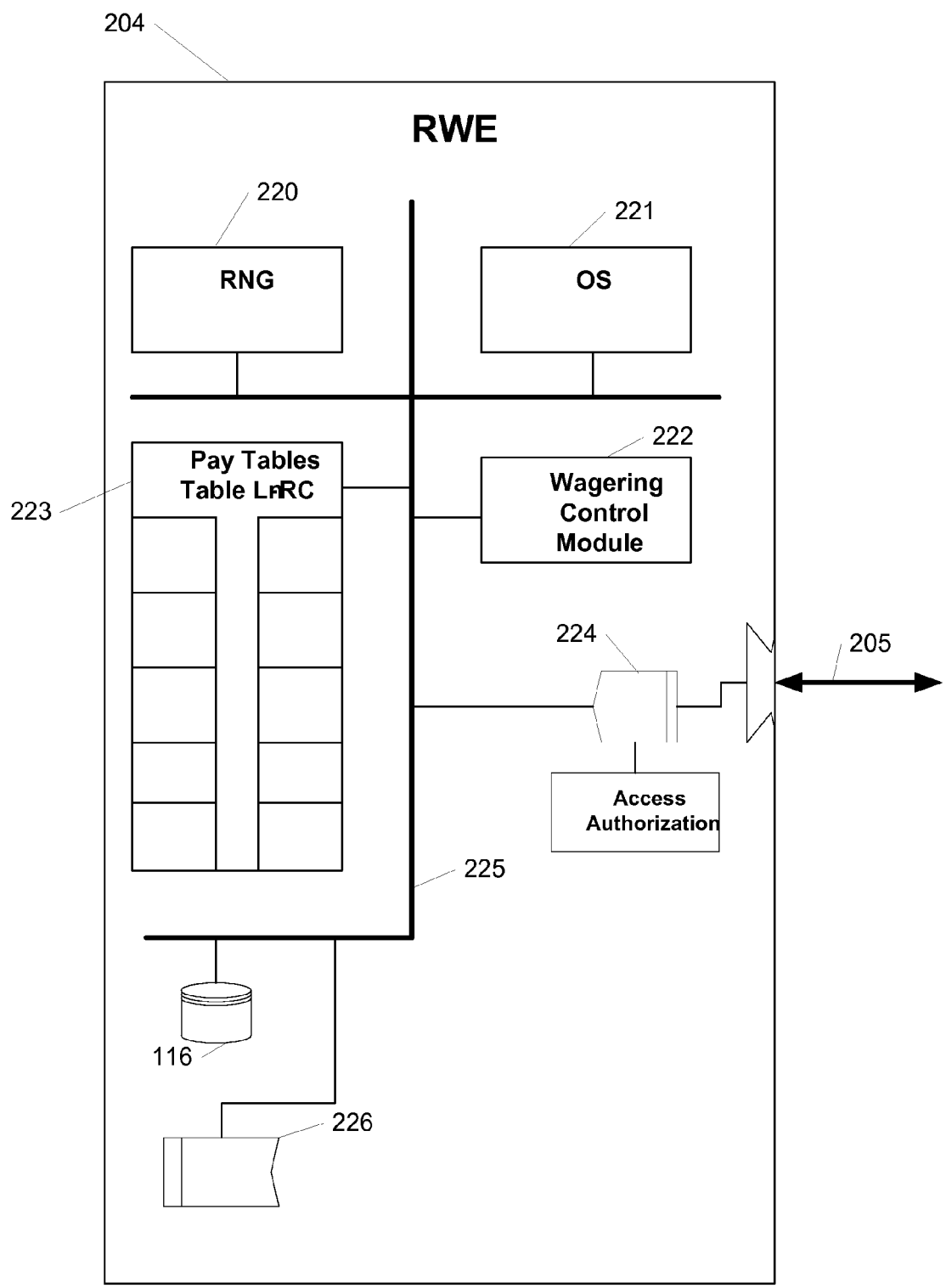
FIG. 2 illustrates a conceptual diagram of aspects of a Real World Engine (RWE) of a gambling hybrid game in accordance with some embodiments of the invention.

The components provided by the RWE for a gambling hybrid game in accordance with embodiments of the invention are shown in FIG. 2. In accordance with embodiments of the invention, the RWE includes an internal bus 225 that connects an operating system OS 221, a Random Number Generator ("RNG") 220, one or more pay tables (Table Ln-RC) 223 which would control the functions of the RWE, a Random Number Generator ("RNG") 220 to produce random numbers, one or more pay tables (Table Ln-RC) 223, a wagering control module 222, an authorization access module 224, and a RC credit meter 226 that are included in the RWE 204. The RW OS 221 controls the functions of the RWE. The RNG 220 includes one or more RNGs that are used to produce random numbers for use in resolving gambling events and other process requiring a random number to determine an outcome. The one or more pay tables (Table Ln-RC) 223 contain a plurality of factors indexed by the random number to be multiplied with the RC wagered to determine the payout on a successful wager. A wagering control module 222 performs the processes to resolve a wager on a proposition of a gambling event. The resolution process includes, but is not limited to, pulling random numbers, looking up factors in Pay Tables, multiplying the factors by the amount of RC wagered, and administering a RC credit meter 226. A repository (a credit meter) 926 maintains a record of the amount of RC which player has deposited in the game and has been accumulated by the player.

An external connection allows the RWE 204 to interface to another system or device, which is shown in FIG. 2 as the internet 205 but may be any other network and/or device. The authorization access module 224 of RWE 204 is connected to the external connection and provides a method to permit access and command exchange between an external system and the RWE 904. The RWE 904 also contains storage for statuses, wagers, wager outcomes, meters and other historical events in a storage device 116.

Figure 3:
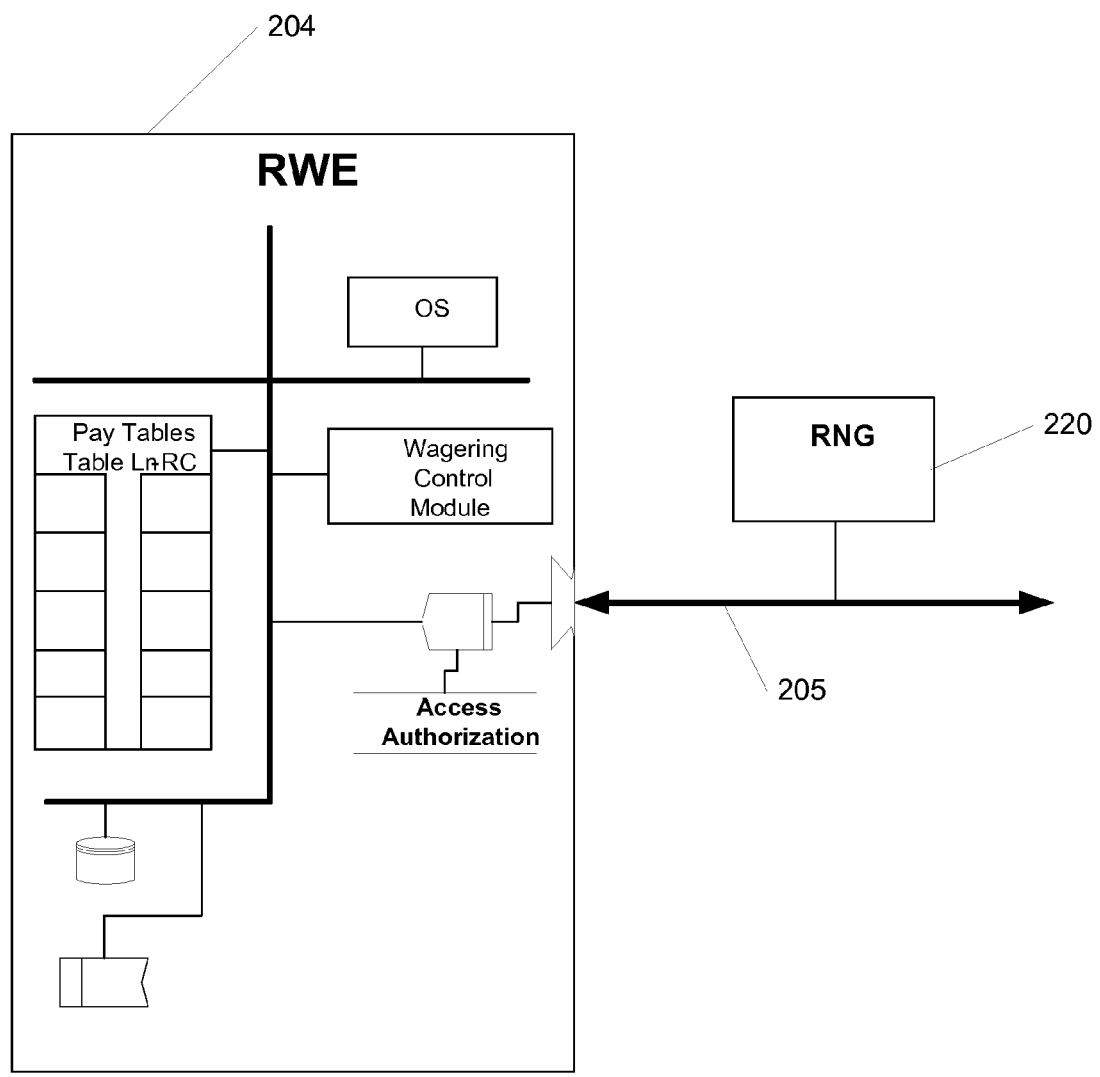
FIG. 3 illustrates a conceptual diagram of aspects of a Real World Engine of a gambling hybrid game in accordance with some other embodiments of the invention.

In some embodiments, the RWE communicates with external systems to provide various functions of a gambling hybrid game in accordance with embodiments of the invention. The components of an RWE that communicate with an external system to provide a component of the RWE in accordance with embodiments of the invention are shown in FIG. 3. The RWE 204 shown in FIG. 3 is similar to the RWE shown in FIG. 2. However, the RNG 220 which is an external system connected to the RWE 204 by the internet 905 in accordance with embodiments of the invention. The RNG 220 could be a central deterministic system, such as a regulated and controlled random numbered ball selection device, or some other system which provides random or pseudo random numbers to one or a plurality of connected RWEs 204. One skilled in the art will recognize that only RNG 220 is an external system in the shown embodiments. However, any of the components could be external systems without departing from the invention and RNG 220 is shown as an example only.

In FIGS. 2 and 3, the RWE 204 interfaces with other systems/devices or to an external RNG 220 using the Internet 205. However, one skilled in the art will note that nothing would preclude using a different interface than the internet 205 in other embodiments of the invention. Other examples of interfaces include, but are not limited to, a LAN, a USB interface, or some other method by which two electronic and software constructs could communicate with each other.

Figure 4:
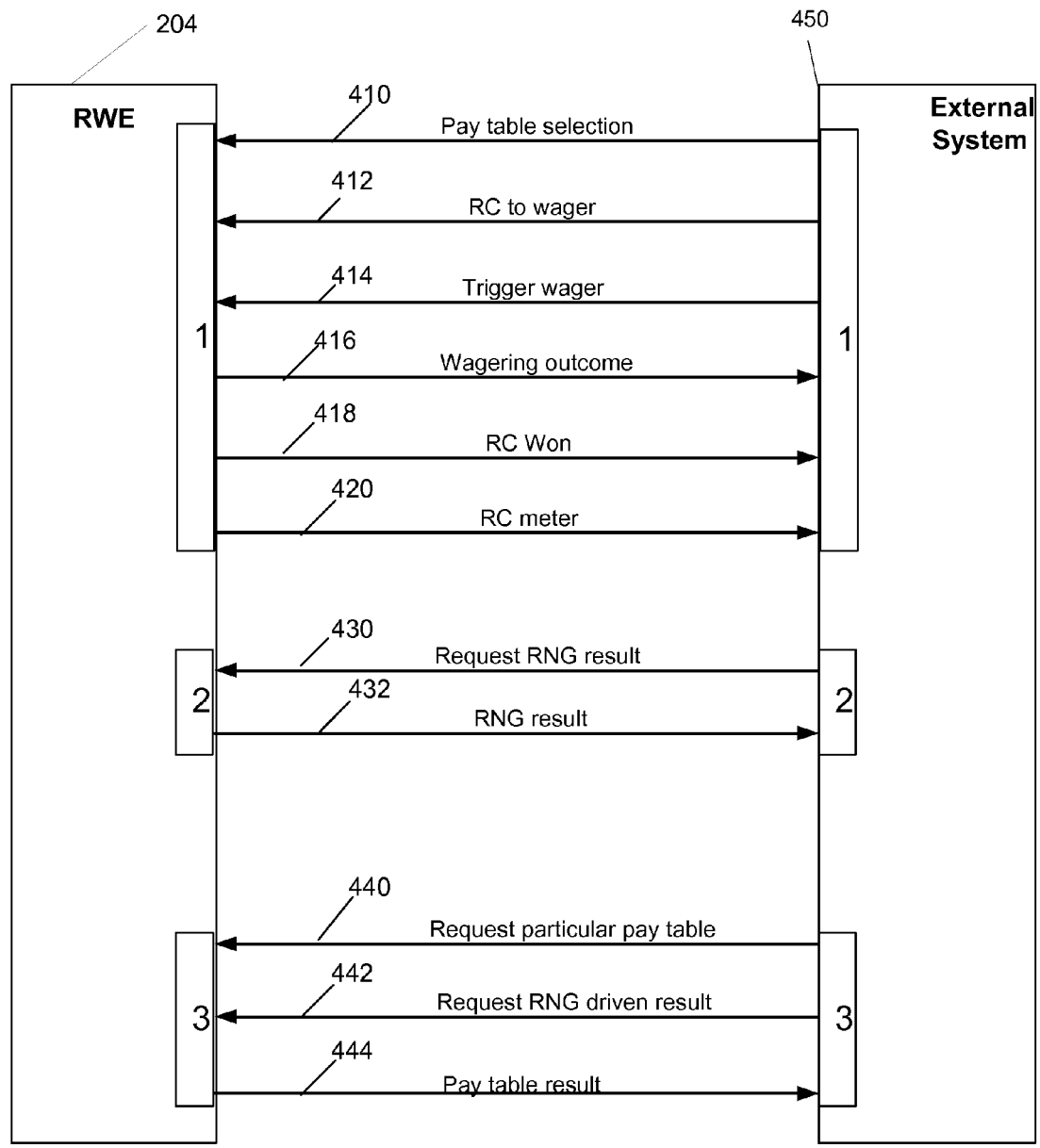
FIG. 4 illustrates a signaling diagram of communications between a Real World Engine (RWE) and an external system to provide various functions in accordance with embodiments of the invention.

The RWE and an external system typically communicate to provide the resolution of gambling events to resolve wagers on the events. The signals between the RWE and an external system to provide some process related to resolving gambling events in accordance with embodiments of the invention are shown in FIG. 4. In accordance with embodiments of the invention, the primary function of the RWE 204 is to manage wagering events and to provide random (or pseudo random) numbers from an RNG. At the top of the figure, a 6 component communication exchange grouped by the "1" box is shown for a wager on a proposition in a gambling event during a gambling hybrid game in accordance with embodiments of the invention. An external system 450 that is requesting wagering support from the RWE 204 instructs the RWE 204 as to the pay table (Table Ln-RC) to use (410), followed by the amount of RC to wager on the proposition of the gambling event (412). Next, the external system 450 signals the RWE to trigger a wager or perform the gambling event (414). The RWE 204 resolves the gambling event. The RWE 204 then informs external system 450 as to the outcome of the wager (416), the amount of RC won (418), and the amount of RC in the player's account (in the credit repository) (420).

A second communication exchange between the RWE 204 and an external system 450 in accordance with embodiments of the invention that is shown in FIG. 4 is grouped by the "2" box in FIG. 4 and relates to the external system 450 needing an RNG result support from the RWE 204. In this exchange, the external system 450 requests an RNG result from the RWE 204 (430). The RWE 204 returns an RNG result to the external 450 in response to the request (432). The result may be generated as a function of the internal RNG in the RWE 204, or from an RNG external to the RWE 204 to which the RWE 204 is connected.

A third communication exchange between the RWE 204 and the external system 405 in accordance with embodiments of the invention that is shown in FIG. 4 is grouped by the "3" box in the figure and relates to the external system 450 wanting support on coupling an RNG result to a particular Pay Table contained in the RWE 204. In this exchange, the external system 450 instructs the RWE as to the pay table (Table Ln-RC) to use 450. The external system then requests a result whereby the RNG result is coupled to the requested Pay Table (442). The result is returned to the external system 405 by RWE 204 (444). Such an aspect is different from the first exchange shown by the box "1" sequence in that no actual RC wager is conducted. However, such a process t might be useful in coupling certain non-RC wagering entertainment game behaviors and propositions to the same final resultant wagering return which is understood for the gambling hybrid game to conduct wagering.

In regards to FIG. 4, one skilled in the art will note that the thrust of the FIG. 4 is to convey overall functional exchanges between an RWE 204 and an external system 450. As such, various protocol layers necessary for error free and secure communication, and other status, setup, and configuration commands which one might expect in any protocol between two connected systems have been omitted for clarity. Furthermore, some or all of the various commands and responses illustrated could be combined into one or more communication packets without departing from the invention.

Figure 5:
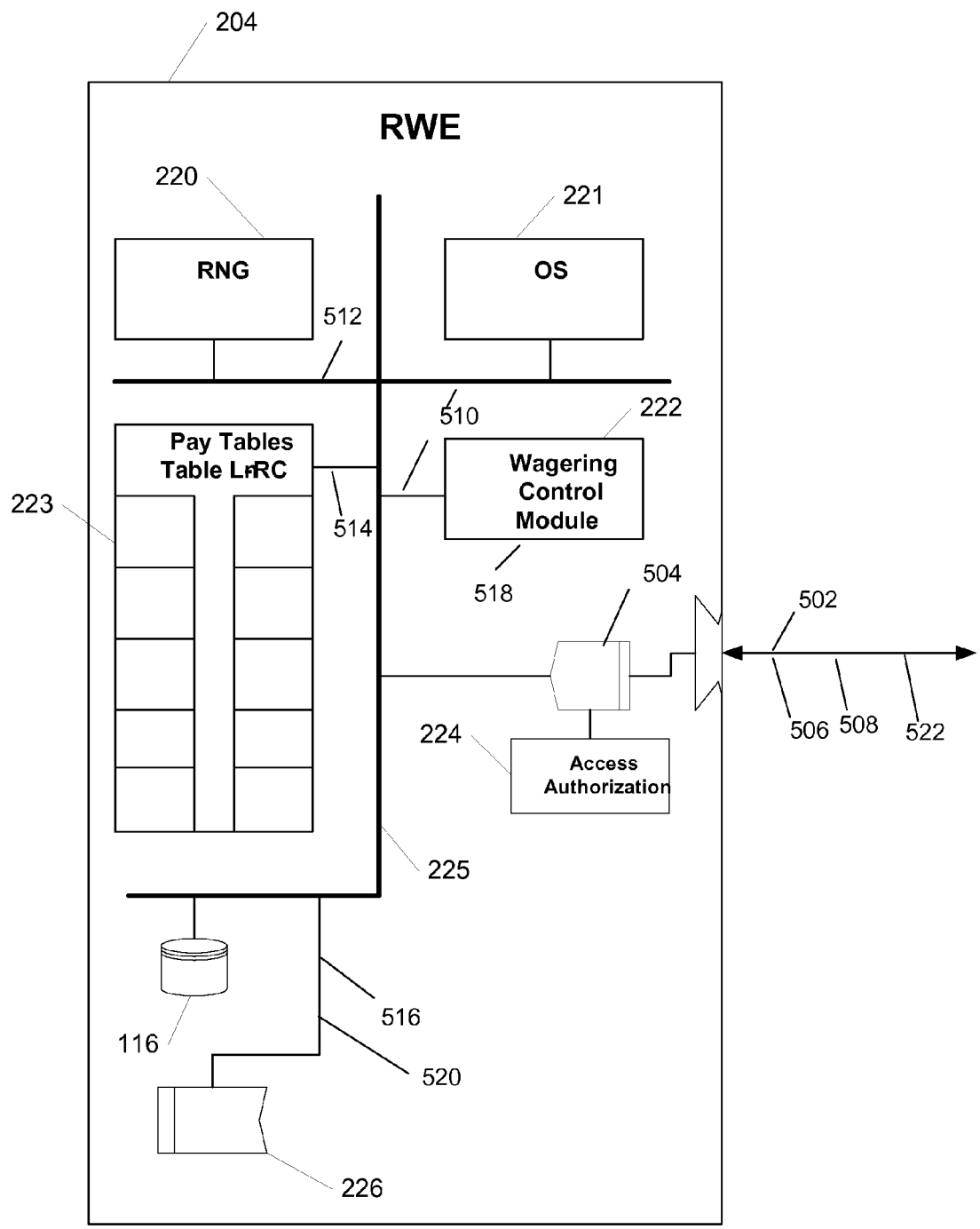
FIG. 5 illustrates a conceptual diagram of a process flow and signaling in a RWE to provide various functions in accordance with embodiments of the invention.

The process flow for functional communication exchanges, such as communication exchanges described above with reference to FIG. 4, between a RWE and an external system in accordance with embodiments of the invention are shown in FIG. 5. The process begins by a RWE 204 receiving signals from an external system requesting a connection to RWE 204. The Access Authorization Module determines that the external system authorized to connect to RWE 204 (504) and transmits an authorization response to the external system. The external systems that provide requests a request for a gambling event is to be performed to RWE 294 (506). The request may include an indication of a wager amount on a proposition in the gambling event, and a proper pay table to use to resolve the wager. The external system then sends a signal to trigger the gambling event (508).

The OS 221 instructs the Wager Control Module 222 as to the RC wager and the Pay Table to select as well as to resolve the wager execute (510). In response to the request to execute the gambling event, the wager control module 222 requests an RNG result from the RNG 220 (512); retrieves a proper pay table or tables from the pay tables 223 (514); adjusts the RC of the player in the RC repository 926 as instructed (516; applies the RNG result to the particular pay table or tables (518); and multiplies the resultant factor from the Pay Table by the amount of RC to determine the result of the wager (518). Wager Control Module 222 then adds the amount of RC won by the wager to the RC repository 426 (520); and provides the outcome of the wager, and the amount of RC in the RWE and the RC won (522). One skilled in the art will recognize that there may be many embodiments of an RWE 204 which could be possible, including forms where many modules and components of the RWE are located in various servers and locations, so the foregoing is not meant to be exhaustive or all inclusive, but rather provide information about an RWE 204 in accordance with some embodiments of the invention.

Figure 6:
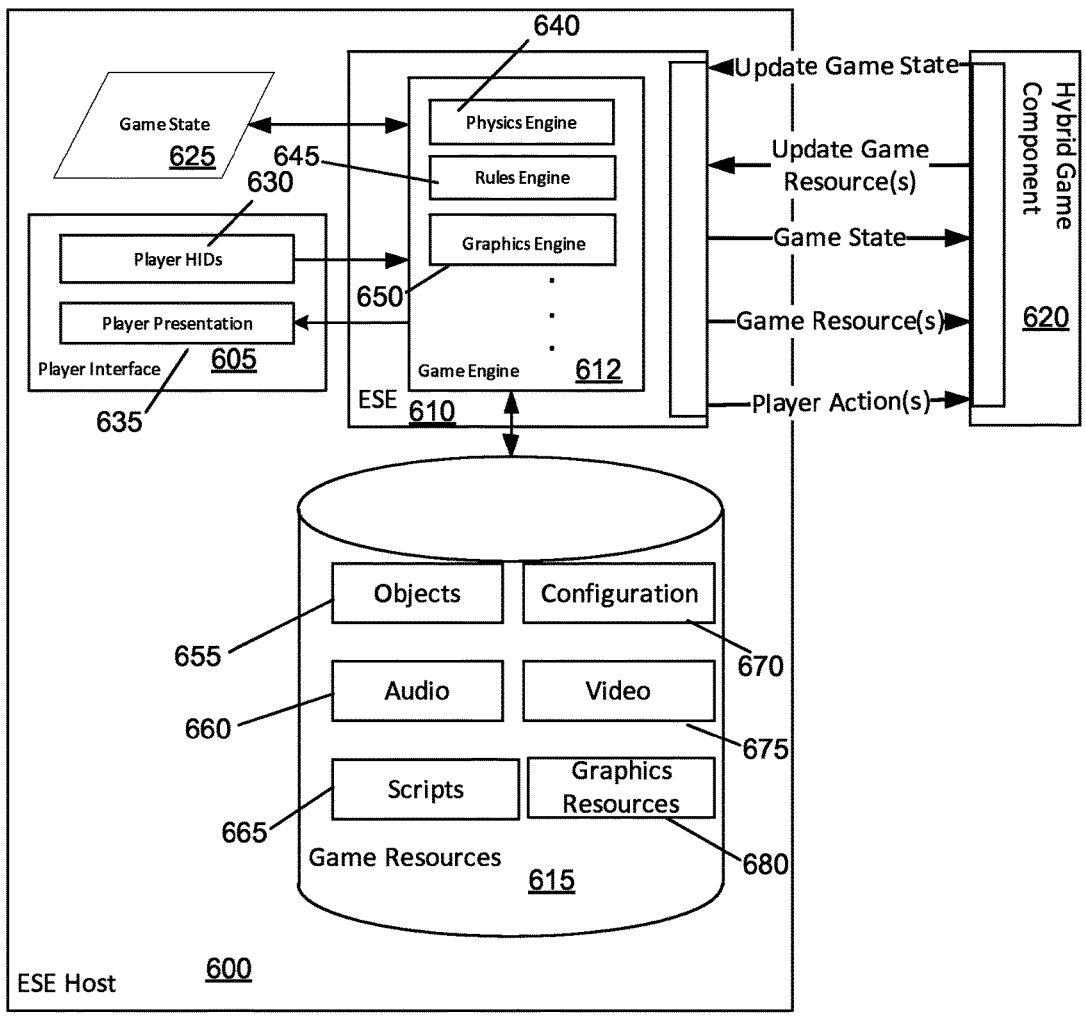
FIG. 6 illustrates a conceptual diagram of aspects of an Entertainment System Engine in accordance with embodiments of the invention.

A block diagram of components an ESE being provided by an ESE host for a gambling hybrid game in accordance with embodiments of the invention are shown in FIG. 6. An ESE 610 may be part of the entertainment game itself, may be a software module that is executed by the entertainment game, or may provide an execution environment for the entertainment game for a particular host. The ESE 610 and associated entertainment game are hosted by an ESE host 600. The ESE host 600 is a computing device that is capable of hosting the ESE 610 and the entertainment game. Exemplary hosts include video game consoles, smart phones, personal computers, tablet computers, or the like. The entertainment game includes a game engine 612 that generates a player interface 605 for interaction with by a player. The player interface includes a player presentation 635 that is presented to a player through the player interface. The player presentation 635 may be audio, visual or tactile, or any combination of such. The player interface 635 further includes one or more Human Input Devices (HIDs) 630 that the player uses to interact with the entertainment game. Various components or sub-engines of the game engine read data from a game state in order to implement the features of the game. Components of the game engine include a physics engine 640 used to simulate physical interactions between virtual objects in the game state, a rules engine 645 for implementing the rules of the game, an RNG that may be used for influencing or determining certain variables and/or outcomes to provide a randomizing influence on game play, a graphics engine 650 used to generate a visual representation of the game state to the player, an audio engine to generate audio outputs for the player interface, and any other engine needed to provide the entertainment game. The game engine 612 reads and writes game resources 615 stored on a data store of the ESE host. The game resources 615 include game objects 655 having graphics and/or control logic used to implement game world objects of the game engine. The game resources 615 also include video files 675 that are used to generate cut-scenes for the entertainment game. The game resources 615 may also include audio files 660 used to generate music, sound effects, etc. within the entertainment game. The game resources 615 may also include configuration files 670 used to configure the features of the entertainment game. The game resources 615 may also include scripts 665 or other types of control code used to implement various game play features of the entertainment game. The game resources 615 may also include graphics resources 680 including, but not limited to, textures, and objects that are used by the game engine to render objects displayed in the entertainment game.

In operation, components of the game engine 612 read portions of the game state 625 and generate the player presentation for the player which is presented to the player using the player interface 605. The player perceives the presentation 635 and provides player inputs using the HIDs 630. The corresponding player inputs are received as player actions or inputs by various components of the game engine 612. The game engine translates the player actions into interactions with the virtual objects of the game world stored in the game state 625. Components of the game engine 612 use the player interactions with the virtual objects of the game and the game state 625 to update the game state 625 and update the presentation 635 presented to the user. The process loops in a game loop continuously while the player plays the game.

In some embodiments, the ESE is a host running a browser that communicates with a server serving documents in a markup language, such as Hypertext Markup Language 5 (HTML 5) or the like, and the functions of the game engine are performed by the browser on the basis of the markup language found in the documents. In some embodiments, the ESE is a host hosting a specialized software platform, such as Adobe Flash or the like, used to implement games or other types of multimedia presentations, and the functions of the game engine are performed by the specialized platform.

The ESE 610 provides one or more interfaces between an entertainment game and other components 620 of a gambling hybrid game, such as a GWE. The ESE 610 and the other gambling hybrid game component 620 communicate with each other using the interfaces, such as by passing various types of data and sending and receiving messages, status information, commands and the like. Examples of communications include, but are not limited to, requesting by the gambling hybrid game component 620 that the ESE 610 update the game state using information provided by the other component; requesting, by the gambling hybrid game component 620, that the ESE 610 update one or more game resources using information provided by the gambling hybrid game component 620; the ESE 610 providing all or a portion of the game state; the ESE 610 providing one or more of the game resources to the gambling hybrid game component 620; and the ESE 610 communicating player actions to the other gambling hybrid game component 620. The player actions may be low level player interactions with the player interface, such as manipulation of an HID, or may be high level interactions with objects as determined by the entertainment game. The player actions may also include resultant actions such as modifications to the game state or game resources resulting from the player's actions taken in the game. Other examples of player actions include actions taken by entities, such as Non-Player Characters (NPC) of the entertainment game, that act on behalf of, or under the control of, the player.

Elements are a limited resource consumed within an entertainment game to advance entertainment game gameplay. In playing the entertainment game using the elements, a player can (optionally) consume and accrue game world credits (GWC) within the entertainment game. These credits can be in the form of (but are not limited to) game world credits, experience points, or points generally. Wagers can be made in the gambling game as triggered by the player's use of one or more elements of the entertainment game. The wagers are made using real world credits (RC). The real world credits can be credits in an actual currency, or can be credits in a virtual currency which may have a real world value. Gambling outcomes from the gambling game can cause consumption, loss or accrual of RC. In addition, gambling outcomes in the gambling game can influence elements in the entertainment game such as (but not limited to) by restoring a consumed element, causing the loss of an element, restoration or placement of a fixed element. In certain embodiments, gambling games can facilitate the wager of GWC for a randomly generated payout of GWC or a wager of elements for a randomly generated payout of elements. In particular embodiments, an amount of GWC and/or elements used as part of a wager can have a RC value if cashed out of a gameplay session.

Example elements include enabling elements (EE) which are elements that enable a player's play of the entertainment game and whose consumption by the player while playing the entertainment game can trigger a wager in a gambling game. Another non limiting example of an element is a reserve enabling element (REE), which is an element that converts into one or more enabling elements upon occurrence of a release event in skill wagering interleaved game gameplay. Other types of elements include actionable elements (AE) which are elements that are acted upon to trigger a wager in the gambling game and may or may not be restorable during normal play of the entertainment game. Another type of element is a common enabling element (CEE) which as an element that may be shared by two or more players and the use of which by any of the players causes a wager to be triggered.

In progressing through entertainment game gameplay, elements can be utilized by a player during interactions with a controlled entity (CE) which is a character, entity, inanimate object, device or other object under control of a player.

Also, entertainment game gameplay progress and wager triggers can be dependent upon a game world variable such as, but not limited to: a required game object (RGO) which is a specific game object in an entertainment game acted upon for an AE to be completed (such as but not limited to a specific key needed to open a door); a required environmental condition (REC) which is a game state present within an entertainment game for an AE to be completed (such as but not limited to daylight whose presence enables a character to walk through woods); or a controlled entity characteristic (CEC) which is a status of the CE within an entertainment game for an AE to be completed (such as but not limited to a CE to have full health points before entering battle). Although various gameplay resources, such as but not limited to GWC, RC and elements as discussed above, any gameplay resource can be utilized to advance gameplay as well as form the basis for a trigger of a wager as appropriate to the specification of a specific application in accordance with various embodiments of the invention. Various hybrid games are discussed in PCT Application Nos. PCT/US11/26768, filed Mar. 1, 2011, PCT/US11/63587, filed Dec. 6, 2011, and PCT/US12/50204 filed Aug. 9, 2012, each disclosure of which is hereby incorporated by reference in its entirety.

Figure 7:
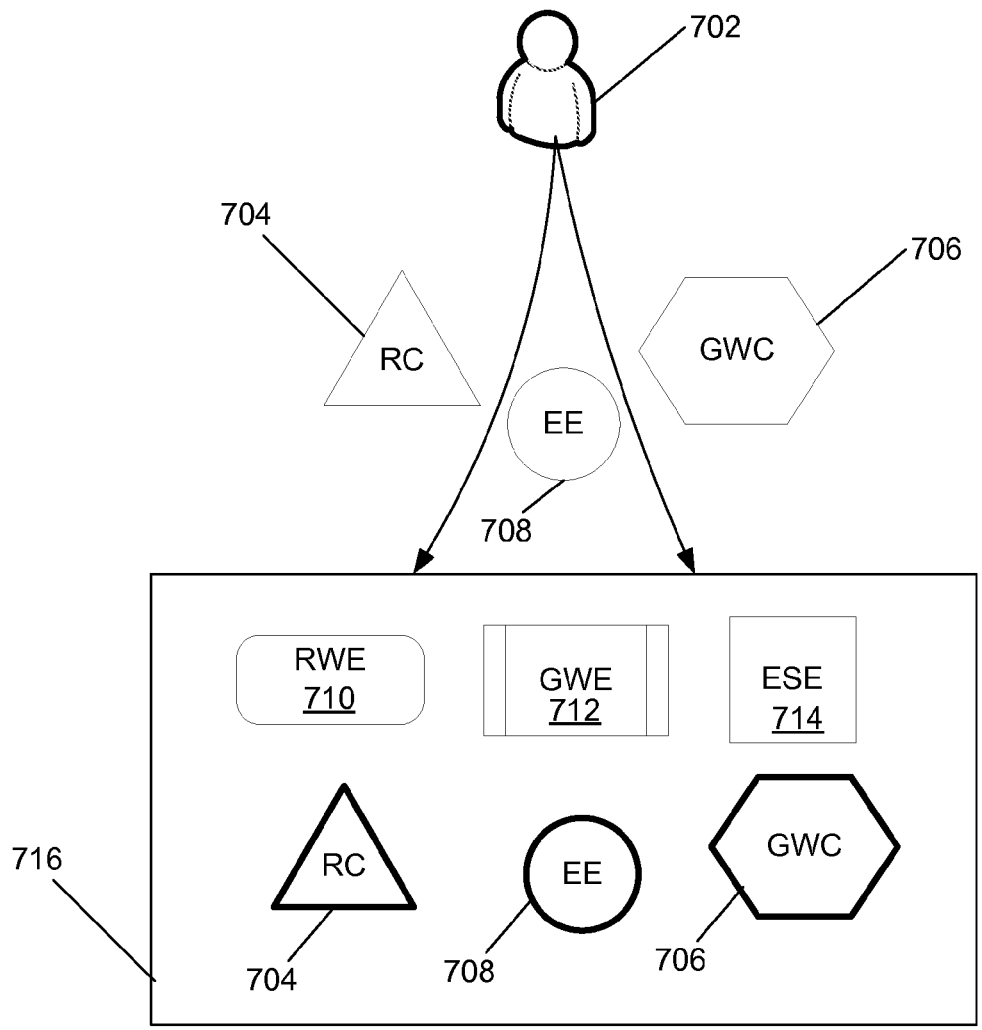
FIG. 7 illustrates a conceptual diagram of interactions between a user and a gambling hybrid game in accordance with embodiments of the invention.

In accordance with some embodiments, a player can interact with a gambling hybrid game by using RC in interactions with a gambling game along with GWC and elements in interactions with an entertainment game. The gambling game can be executed by a RWE while an entertainment game can be executed with an ESE and managed with a GWE. A conceptual diagram that illustrates how resources such as GWC, RC and elements, such as but not limited to enabling elements (EE), are utilized in a gambling hybrid game in accordance with an embodiment of the invention is illustrated in FIG. 7. The conceptual diagram illustrates that RC 704, EE 708 and GWC 706 can be utilized by a player 702 in interactions with the RWE 710, GWE 712 and ESE 714 of a based gambling hybrid game 716. The contribution of elements, such as EE 708, can be linked to a player's access to credits, such as RC 704 or GWC 706. Electronic receipt of these credits can come via a smart card, voucher or other portable media, or as received over a network from a server. In accordance with certain embodiments, these credits can be drawn on demand from a player profile located in a database locally on a gambling hybrid game or in a remote server.

Figure 8:
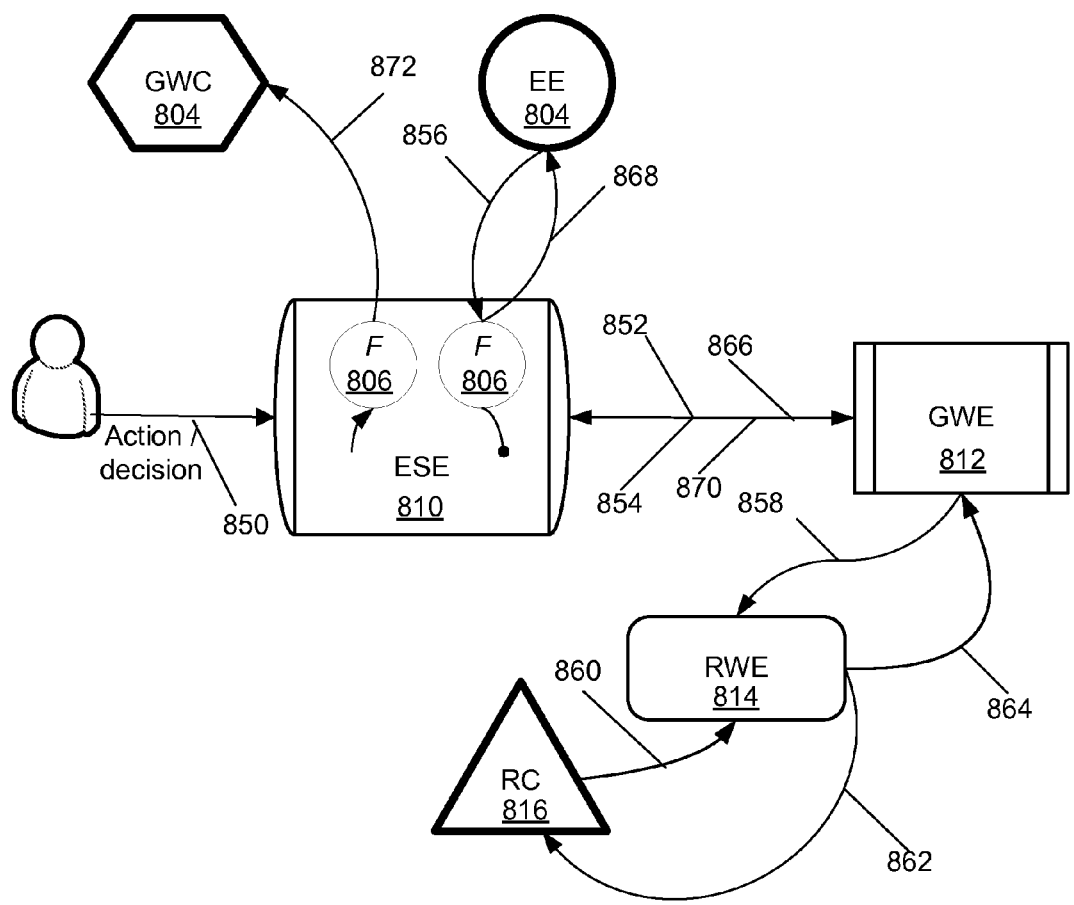
FIG. 8 illustrates a conceptual diagram that illustrates the interplay between aspects of a gambling hybrid game in accordance with some embodiments of the invention using Real World Currency (RC).

A conceptual diagram that illustrates the interplay between aspects of a gambling hybrid game in accordance with an embodiment of the invention using real world credit (RC) is illustrated in FIG. 8. Similar to FIG. 7, a player's actions and/or decisions can affect functions 806 that consume and/or accumulate GWC 802 and/or EE 804 in an entertainment game executed by an ESE 810. A GWE 812 can monitor the activities taking place within an entertainment game executed by an ESE 810 for gameplay gambling event occurrences. The GWE 812 can also communicate the gameplay gambling event occurrences to an RWE 814 that triggers a wager of RC 816 in a gambling game executed by the RWE 814.

In accordance with some embodiments of the invention, the following may occur during use of the gambling hybrid game. The user enters an input that represents an action or decision (850). The ESE 810 signals the GWE 812 with the input decision or action (852). The GWE 812 responds by signaling to ESE 810 with the amount of EE that is consumed by the player action or decision (854). The signaling from the GWE 812 configures a function 806 to control the EE consumption, decay, and/or accumulation.

The ESE 810 then adjusts the EE 804 accordingly (856). The GWE 812 signals the RWE 814 as to the profile of the wager proposition associated with the action or decision and triggers the wager (858). The RWE 814 consumes the appropriate amount of RC 816 and executes the wager (860). The RWE 814 then adjusts the RC 816 based upon the outcome of the wager (862) and informs the GWE 812 as to the outcome of the wager (864).

The GWE 812 signals the ESE 810 to adjust EE to one or more of the EEs of the ESE entertainment game (866). Function 806 of the ESE 810 performs the adjustment of EE 804 (868). The ESE 810 signals the GWE 812 as to the updated status (870). In response, the GWE 812 signals the ESE 810 to update GWC of the entertainment game. The ESE updates the GWC 802 using a function 806 (872).

The following is an example of the above flow in a first person shooter game, such a Call of Duty®, using a gambling hybrid game sequence in accordance with embodiments of the invention.

The process begins by a player selecting a machine gun to use in the game and then fires a burst of bullets at an opponent (850). The ESE 810 signals the GWE 812 of the player's choice of weapon, that a burst of bullets was fired, and the outcome of the burst (852). GWE 812 processes the information received and signals ESE 810 to consume 3 bullets (EE) with each pull of the trigger (854). The ESE 810 consumes 3 bullets for the burst using function 806 (856).

The GWE 812 signals the RWE 814 that 3 credits (RC) are to be wagered to match the three bullets consumed. The RWE 814 then determines the result of the wager and may determine the winnings from a pay table. On a particular pay table (Table Ln-RC), a determination is made by RWE 814 as to the amount of damage that the opponent has sustained. The RWE 814 consumes 3 credits of RC 816 for the wager and executes the specified wager (860). The RWE 814 determines that the player hit a jackpot of 6 credits and returns the 6 credits to the RC 816 (862) and signals the GWE 812 that 3 net credits were won by the player (864).

The GWE 812 signals ESE 810 to add 3 bullets to an ammunition clip (866). ESE 810 adds 3 bullets back to the ammo clip (EE 804) using a function 806 (868). The ammunition may be added by directly adding the ammunition to the clip or by allowing the user to find extra ammunition during game play. The GWE 812 logs the new player score (GWC 802) in the game (as a function of the successful hit on the opponent) based on the ESE 810 signaling, and the signals the ESE 810 to add 2 extra points to the player score since a jackpot has been won (870). The ESE 810 then adds 10 points to the player score (GWC 802) given the success of the hit which in this example is worth 8 points, plus the 2 extra points requested by GWE 812 (872). Note that the foregoing example is only intended to provide an illustration of how credits flow in a gambling hybrid game, but is not intended to be exhaustive and only lists only one of numerous possibilities of how a gambling hybrid game may be configured to manage its fundamental credits.

Figure 9:
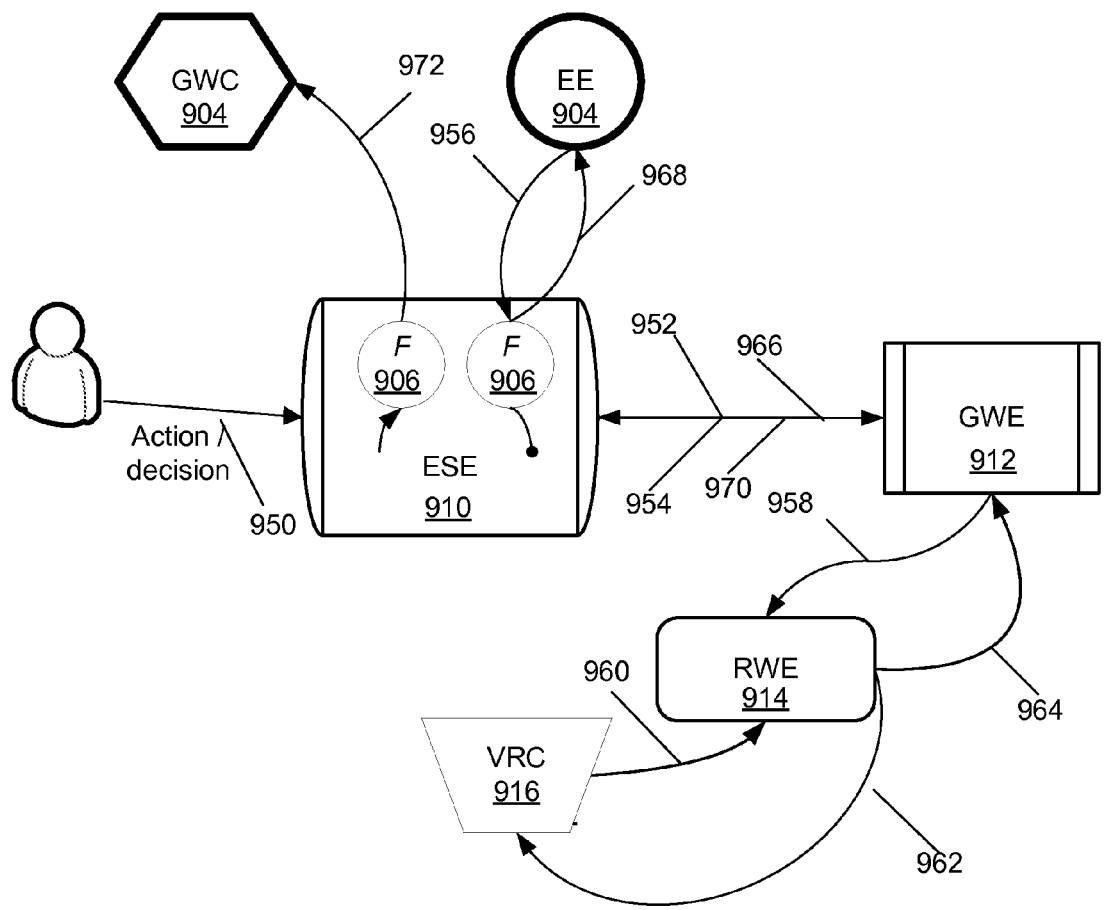
FIG. 9 illustrates a conceptual diagram that illustrates the interplay between aspects of a gambling hybrid game in accordance with other embodiments of the invention using Virtual Real World Currency (VRC).

A conceptual diagram that illustrates the interplay between aspects of a gambling hybrid game in accordance with an embodiment of the invention using virtual real world credit (VRC) is illustrated in FIG. 9. As seen in the FIG. 9, substituting VRC in place of RC is effected without impact to the architecture or operation of the gambling hybrid game. The implementation of FIG. 9 is not the only embodiment using virtual currency within a gambling hybrid game, but shows only one permutation of which many could exist.

Similar to FIG. 8, a player's actions and/or decisions can affect functions 906 that consume and/or accumulate GWC 902 and/or EE 904 in an entertainment game executed by an ESE 910 in the process shown in FIG. 9. A GWE 912 can monitor the activities taking place within an entertainment game executed by an ESE 910 for gameplay gambling event occurrences. The GWE 912 can also communicate the gameplay gambling event occurrences to a RWE 914. Unlike the process shown in FIG. 8, RWE 914 triggers a wager of virtual real world credit (VRC) 916 in a gambling game executed by the RWE 914.

For purposes of this discussion, VRC can be thought of as a form of alternate currency, which can be acquired, purchased or transferred, in unit or in bulk, by/to a player, but does not necessarily directly correlate to RC or real currency. As an example, there is a virtual currency called "Triax Jacks", 1000 units of which are given to a player by an operator of a gambling hybrid game, with additional blocks of 1000 units being available for purchase for $5 USD each block. Triax Jacks could be redeemed for various prizes, or could never be redeemed but simply used and traded purely for entertainment value by players. It would be completely consistent with the architecture of the gambling hybrid game that Triax Jacks would be wagered in place of RC, such that the gambling hybrid game could be played for free, or with played with operator sponsored Triax Jacks.

Returning to the process in FIG. 9, the following may occur during use of the gambling hybrid game in accordance with embodiments of the invention. The user enters an input that represents an action or decision (950). The ESE 910 signals the GWE 912 with the input decision or action (952). The GWE 912 responds by signaling to ESE 910 with the amount of EE that is consumed by the player action or decision (954). The signaling from the GWE 912 configures a function 906 to control the EE consumption, decay, and/or accumulation.

The ESE 910 then adjusts the EE 904 accordingly (956). The GWE 912 signals the RWE 914 as to the profile of the wager proposition associated with the action or decision and triggers the wager (958). The RWE 914 consumes the appropriate amount of RC 916 and executes the wager (960). The RWE 914 then adjusts the RC 916 based upon the outcome of the wager (962) and informs the GWE 912 as to the outcome of the wager (964).

The GWE 912 signals the ESE 910 to adjust EE to one or more of the EEs of the ESE entertainment game (966). Function 906 of the ESE 910 performs the adjustment of EE 904 (968). The ESE 910 signals the GWE 912 as to the updated status (970). In response, the GWE 912 signals the ESE 910 to update GWC 902 of the entertainment game. The ESE updates the GWC 902 using a function 906 (972).

Network Based Gambling Hybrid Game

Figure 10:
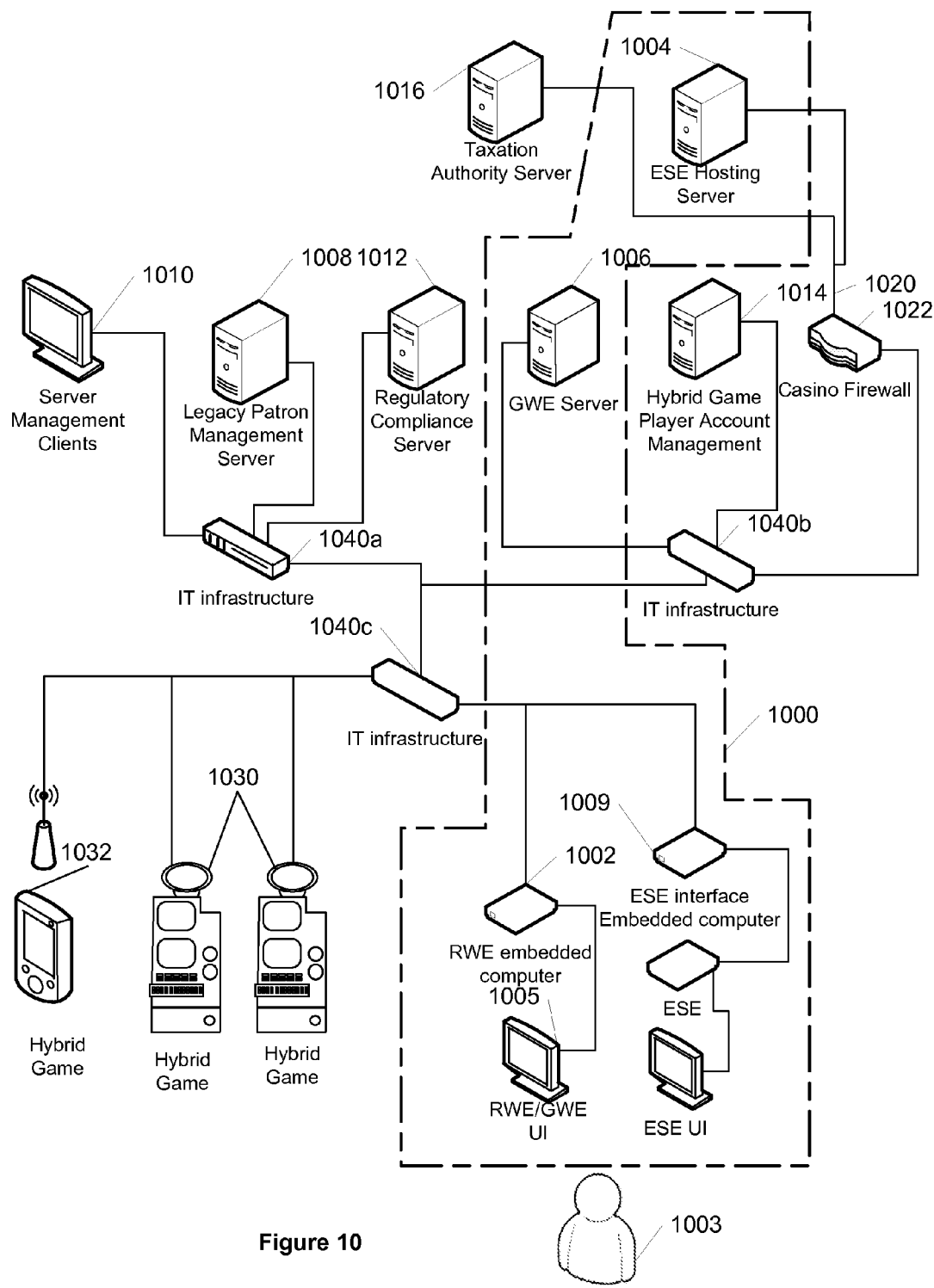
FIG. 10 illustrates a system diagram of an implementation of a network based gambling hybrid game in accordance with another embodiment of the invention.

A system diagram that illustrates an implementation of a network distributed gambling hybrid game with a GWE local server in accordance with embodiments of the invention is illustrated in FIG. 10. In the figure, the gambling hybrid game 1000 includes components, RWE 1002 embedded in a device used as the user interface for player 1003. The device provides both a RWE/GWE user interface 1005 and an ESE user interface 1007 for the player. The ESE is provisioned by an ESE hosting server 1004 via ESE interface 1009, and the GWE is provisioned by GWE server 1006 as indicated by the dashed line. Also pictured in the diagram are a number of other peripheral systems, such as player management 1008, casino management 1010, regulatory 1012, hybrid game player account management 1014, and taxation authority 1016 hosting servers that may be present in such an implementation. FIG. 10 also illustrates various other systems, which may reside outside the bounds of the casino and are connected to the framework via communications network, such as the Internet 1020, depicted by the connection lines past the casino firewall 1022. The end devices utilized for user interfaces for a gambling hybrid game include, but are not limited to, casino electronic game machines 1030 and wireless or portable devices, such as smart phone 1032, personal digital assistants, tablet computers, video gaming consoles or the like. These disparate devices are connected within and without the casino through the casino's information technology structure as illustrated by routers 1040a, 1040b and 1040c. It should be understood that FIG. 10 does not attempt to illustrate all servers and systems to which a gambling hybrid game 1000 might be inevitably be connected, and indeed one might expect there would be others, but rather provides an example of a set of a sub-set of systems which would be present in an exemplary embodiment of an installation.

Figure 11:
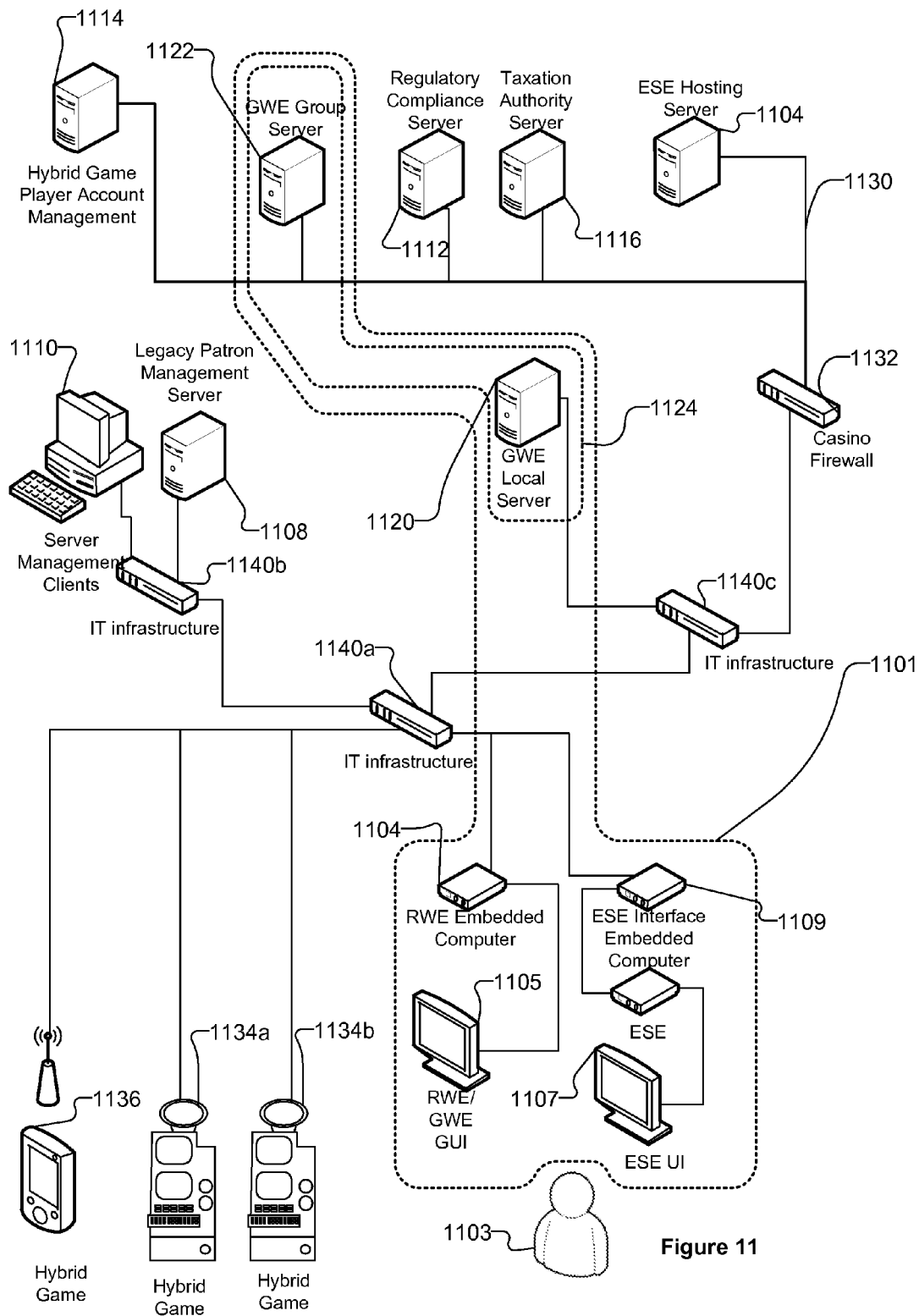
FIG. 11 illustrates a system diagram of an implementation of an Internet based gambling hybrid game in accordance with an embodiment of the invention.

FIG. 11 is a diagram showing another implementation of a gambling hybrid game in accordance with an exemplary embodiment. In the figure, the gambling hybrid game 1101 includes components, RWE 1104 embedded in a device used as the user interface for player 1103. The device provides both a RWE/GWE user interface 1105 and an ESE user interface 1007 for the player. The ESE is provisioned by an ESE hosting server 1104 via ESE interface 1109. Also pictured in the diagram are a number of other peripheral systems, such as player management 1108, casino management 1110, regulatory 1112, hybrid game player account management 1114, and taxation authority 1116 hosting servers that may be present in such an implementation. In the figure, note that the GWE is composed of two sub-components, a local GWE server 1120, and a cloud server 1122. (components within the dash line area 1124). In the figure, certain of the components are located within the bounds of the casino, namely the RWE, the ESE and a portion of the GWE, namely the local GWE server 1120. The Cloud Server GWE 1122 is located in the cloud connected to the casino bounded gambling hybrid game components via communications network such as the Internet 1130 through a firewall 1132. FIG. 11 also illustrates various other systems, which may reside outside the bounds of the casino and are connected to the framework via communications network. The end devices utilized for user interfaces for a gambling hybrid game include, but are not limited to, casino electronic game machines, 1134a and 1134b, and wireless or portable devices, such as smart phone 1136, personal digital assistants, tablet computers, video gaming consoles or the like. These disparate devices are connected within and without the casino through the casino's information technology structure as illustrated by routers 1140a, 1140b and 1140c. It should be understood that FIG. 11 does not attempt to illustrate all servers and systems to which a gambling hybrid game might be inevitably be connected, and indeed one might expect there would be others, but rather provides an example of a set of a sub-set of systems which would be present in an exemplary embodiment of an installation.

Figure 12:
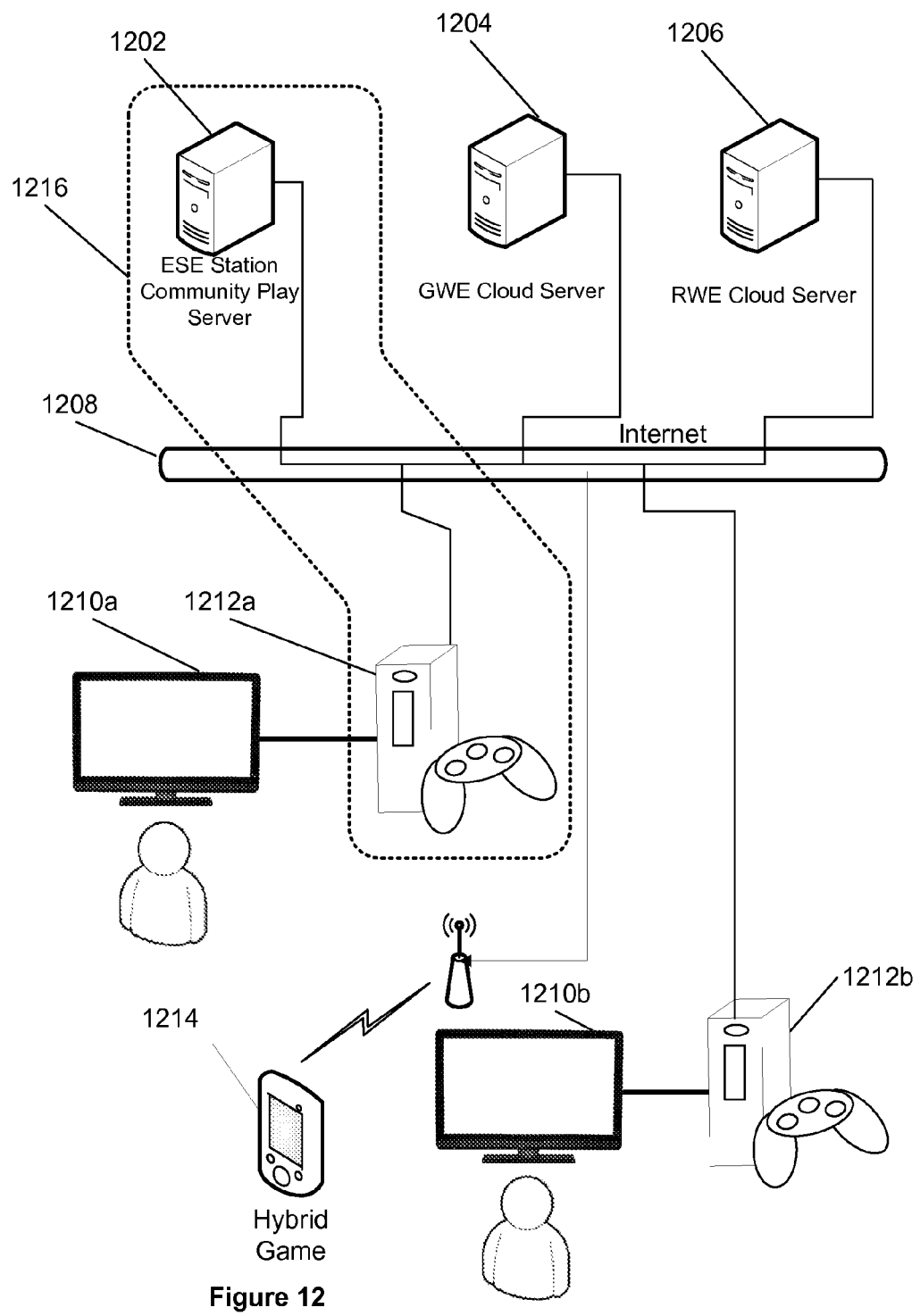
FIG. 12 illustrates a system diagram of an implementation of a cloud based gambling hybrid game in accordance with embodiments of the invention.

A system diagram that illustrates an implementation of network a cloud based gambling hybrid game over the Internet in accordance with an embodiment of the invention is illustrated in FIG. 12. The system includes an ESE server 1202, GWE server 1204 and RWE server 1206 that each connect to a user interface, 1210a or 1210b, (such as, but not limited to, a television screen, computer terminal, tablet, touchscreen or PDA) of gambling hybrid games over the Internet 1208. Each gambling hybrid game includes a local ESE 1212a or 1212b (such as, but not limited to, a video game console or a gaming computer system) that interfaces with a remote ESE server 1002. Processes performed by an ESE 1212a services can be performed in multiple locations, such as, but not limited to, remotely on an ESE server 1202 and locally on a local ESE 1212a. In addition, a gambling hybrid game may include a Personal Digital Assistant (PDA) 1214 or other type of mobile computing device game coupled to the ESE hosting server 1202, thus providing the opportunity for a player to play a gambling hybrid game on the PDA through a mobile phone or data network.

There are many possible permutations of how a gambling hybrid game could be constructed, with FIGS. 10, 11 and 12 showing only three possible permutations and provided as examples, which are not intended to suggest limitations to the forms of the architecture. Other embodiments include a version where the entire gambling hybrid game is in the cloud with only a client running on player terminal within the bounds of the casino, or a version where the RWE and GWE are casino bound and the ESE exists in the cloud, accessed by a client running on a terminal in the casino.

Processing Apparatuses

Figure 13:
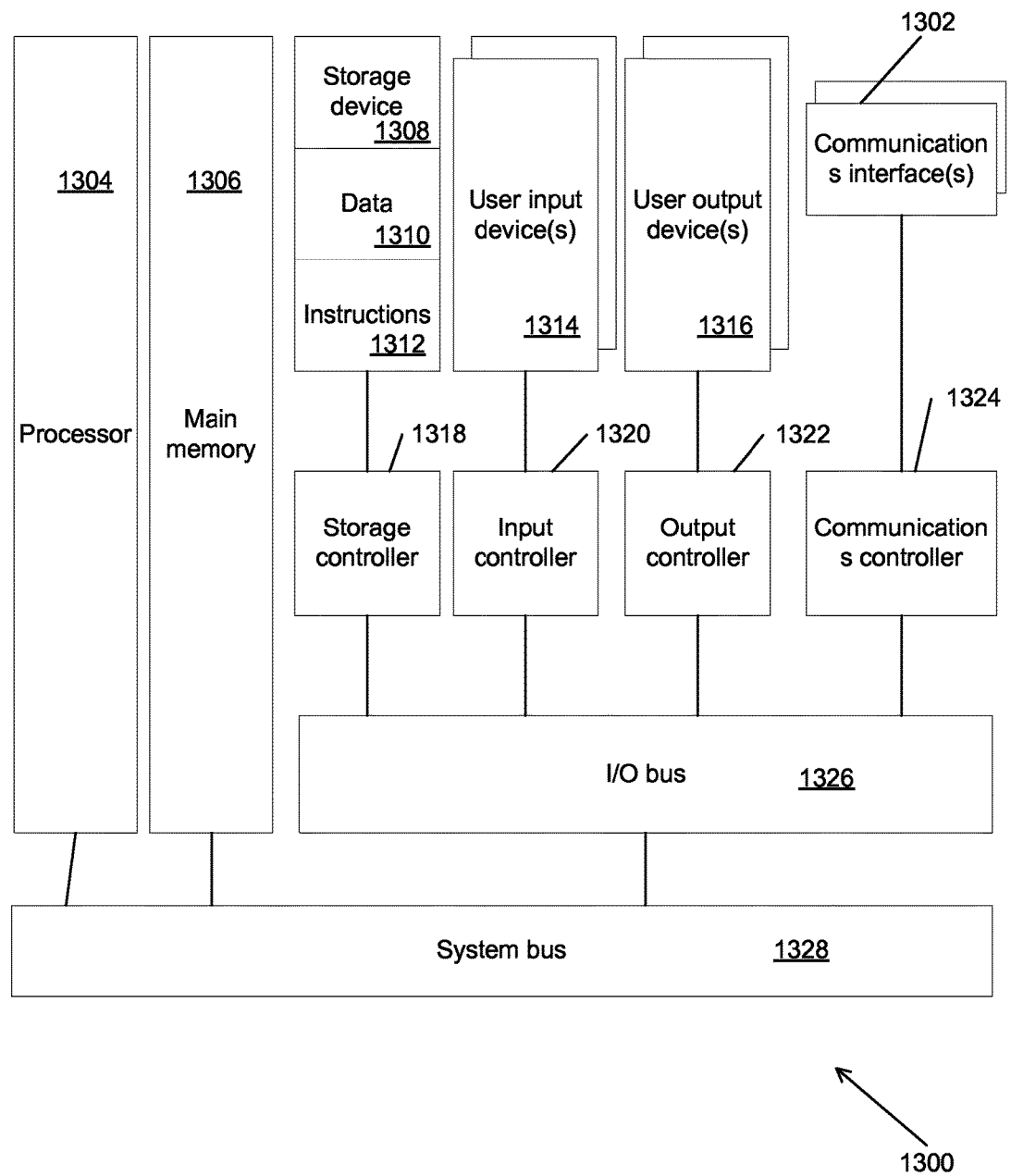
FIG. 13 illustrates a block diagram of components of a device implementing a gambling hybrid game in accordance with an embodiment of the invention.

Any of a variety of processing apparatuses can host various components of a gambling hybrid game in accordance with embodiments of the invention. In accordance with embodiments of the invention, these processing apparatuses can include, but are not limited to, mobile device such as a smartphone, personal digital assistant or the like, a wireless device such as a tablet computer or the like, an electronic gaming machine, a general purpose computer, a computing device and/or a controller. A processing apparatus that is constructed to implement a gambling hybrid game in accordance with embodiments of the invention is illustrated in FIG. 13. In the processing apparatus 1300, a processor 1304 is coupled to a memory 1306 by a bus 1328. The processor 1304 is also coupled to non-transitory processor-readable storage media, such as a storage device 1308 that stores processor-executable instructions 1312 and data 1310 through the system bus 1328 to an I/O bus 1326 through a storage controller 1318. The processor 1304 is also coupled to one or more interfaces that can be used to connect the processor to other processing apparatuses as well as networks as described herein. The processor 1304 is also coupled via the bus to user input devices 1314, such as tactile devices including, but not limited to, keyboards, keypads, foot pads, touch screens, and/or trackballs; as well as non-contact devices such as audio input devices, motion sensors and motion capture devices that the processing apparatus can use to receive inputs from a user when the user interacts with the processing apparatus. The processor 1304 is connected to these user input devices 1314 through the system bus 1328, to the I/O bus 1326 and through the input controller 1320. The processor 1304 is also coupled via the bus to user output devices 1316 such as (but not limited to) visual output devices, audio output devices, and/or tactile output devices that the processing apparatus uses to generate outputs perceivable by the user when the user interacts with the processing apparatus. In accordance with some embodiments, the processor is coupled to visual output devices such as (but not limited to) display screens, light panels, and/or lighted displays. In accordance with particular embodiments, the processor is coupled to audio output devices such as (but not limited to) speakers, and/or sound amplifiers. In accordance with many of these embodiments, the processor 1304 is coupled to tactile output devices like vibrators, and/or manipulators. The processor 1304 is connected to output devices from the system bus 1328 to the I/O bus 1326 and through the output controller 1322. The processor 1304 can also be connected to a communications interface 1302 from the system bus 1328 to the I/O bus 1326 through a communications controller 1324.

In accordance with various embodiments, a processor 1304 can load instructions and data from the storage device into the memory 1306. The processor 1304 can also execute instructions that operate on the data to implement various aspects and features of the components of a gambling hybrid game. The processor 1304 can utilize various input and output devices in accordance with the instructions and the data in order to create and operate user interfaces for players or operators of a gambling hybrid game (such as but not limited to a casino that hosts the gambling hybrid game).

Although the processing apparatus 1300 is described herein as being constructed from a processor and instructions stored and executed by hardware components, the processing apparatus can be composed of only hardware components in accordance with other embodiments. In addition, although the storage device is described as being coupled to the processor through a bus, those skilled in the art of processing apparatuses will understand that the storage device can include removable media such as, but not limited to, a USB memory device, an optical CD ROM, magnetic media such as tape and disks. Also, the storage device can be accessed by processor 1304 through one of the interfaces or over a network. Furthermore, any of the user input devices or user output devices can be coupled to the processor 1304 via one of the interfaces or over a network. In addition, although a single processor 1304 is described, those skilled in the art will understand that the processor 1304 can be a controller or other computing device or a separate computer as well as be composed of multiple processors or computing devices including one or more processors.

Provision of an Object Alignment Entertainment Game by a Gambling Hybrid Game

In accordance with embodiments of the invention, the entertainment game provided by a gambling hybrid game is an object alignment game. An object alignment game is a puzzle game in which a player aligns matching objects in rows and/or columns of a grid containing many different types of objects. The goal in an object alignment game is to form as many lines of matching objects having at least a minimum length in a certain amount of time.

Figure 14:
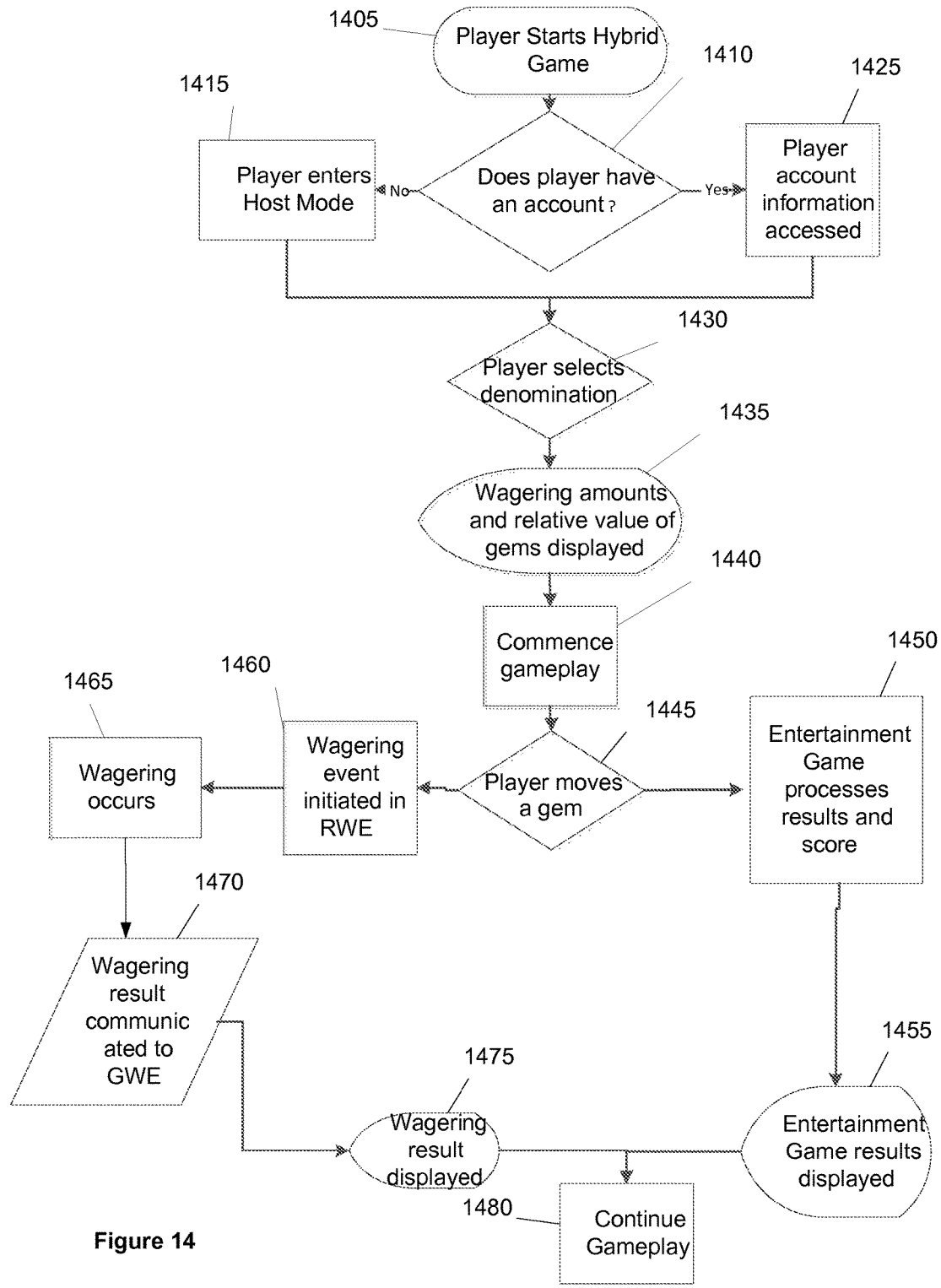
FIG. 14 illustrates a flow diagram of a process performed by a gambling hybrid game to provide an object alignment game as an entertainment game in accordance with embodiments of the invention.

The entertainment engine of the gambling hybrid game provides the entertainment game in particular, an object alignment game, in accordance with embodiments of the invention. The game world engine of the gambling hybrid game monitors the play of the object alignment game by the entertainment engine and determines when gambling events occur based on the play of the object alignment game. The real world engine then resolves the gambling event by determining the result of the gambling and any wagers associated with the gambling event. A process performed by a gambling hybrid game to provide an object alignment entertainment game in accordance with embodiments of the invention is shown in FIG. 14.

In process 1400, the player begins playing the gambling hybrid game (1405). Upon starting the game, the player selects (1410) between using either a player account to provide Real World Credits (RC) and/or game world credits (GWC) for play (1425) or may play a stand-alone or host version (1415) of the game in which RC and/or GWC is entered on a per-play basis. Regardless of the type of game play selected, the player then chooses the denominations or wagering amount to use during game play (1430). The gambling hybrid game then displays the wagering amounts and the relative value of the objects being aligned (1435). The entertainment engine then provides the game play of the object alignment game (1440). During game play, the player moves an object, such as a gem, within a grid of objects (1445). The entertainment engine determines the result of the move as part of game play (1450) and displays the result as part of the game play (1455).

The game world engine detects the movement of the object and may trigger a gambling event. If a gambling event is triggered, the game world engine requests that the real world engine determine the result of the gambling event and associated wagers to resolve the gambling event (1460). The real world engine determines the results of the gambling event and any associated wagers by the player (1465). The results of the gambling event are then provided by the real world engine to the game world engine (1470) and the results of any wagers are displayed to the player (1475). The game play of the object alignment game then continues (1480).

Figure 15:
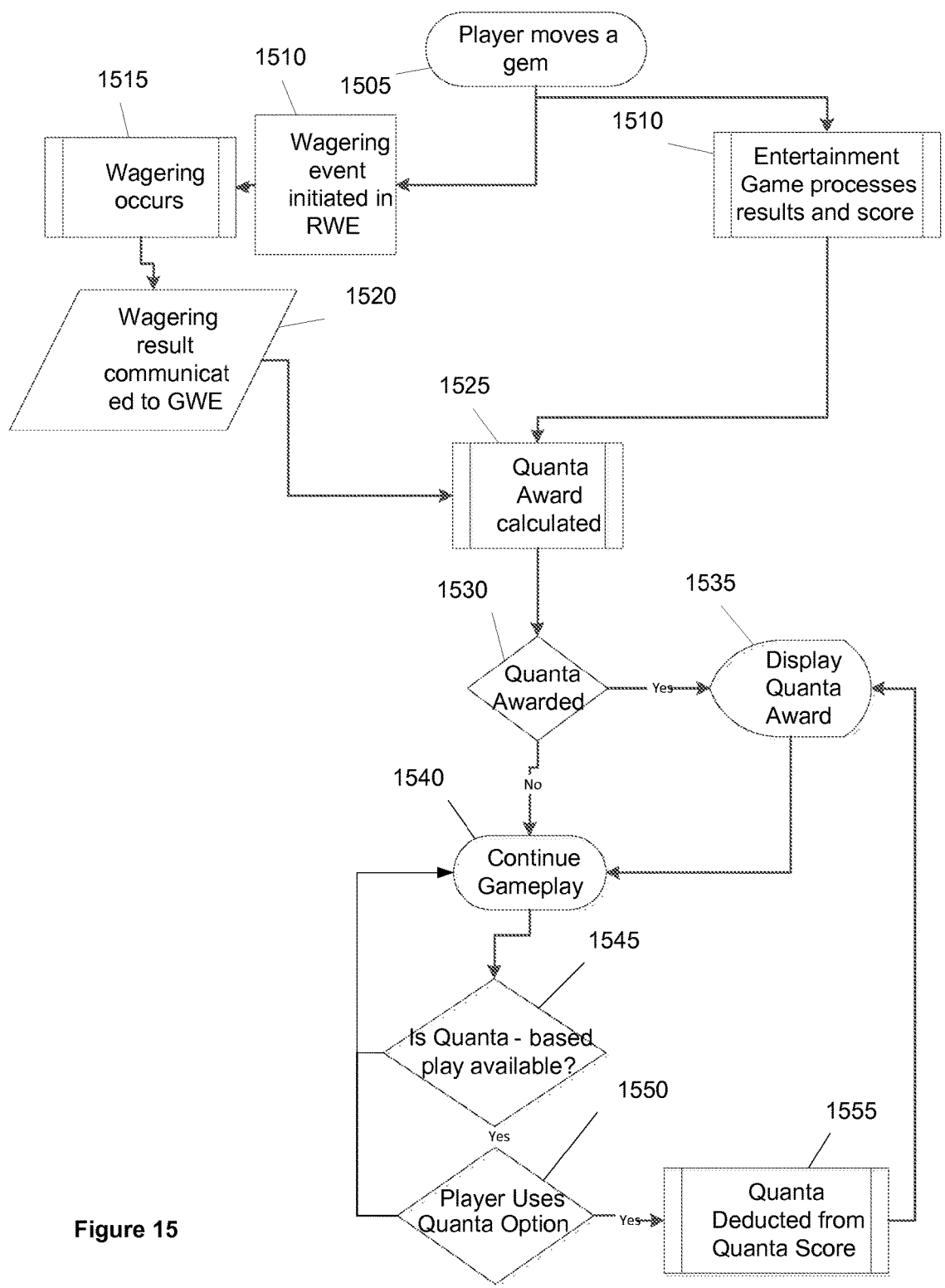
FIG. 15 illustrates a flow diagram of a process performed by a gambling hybrid game to provide an object alignment game in which an intermediate value item is awarded from the results of game play and gambling events in the game in accordance with embodiments of the invention.

In accordance with some embodiments, the result of a gambling event and/or a combination of the results of the gambling event and game play of the object alignment game are used to determine an intermediate value item to award a player. For purposes of this discussion the intermediate value item is hereinafter referred to as quanta. The quanta can then be used to purchase game items or change the value of game parameters. A process performed by a gambling hybrid game providing an object alignment game to award quanta based on the result of a gambling event and the results of game play of the object alignment game in accordance with embodiments of the invention is show in FIG. 15.

In process 1500, the player moves an object in the grid of objects (1505). The entertainment engine then determines the results of the move and updates the game parameters including, but not limited to, the score. The game world engine detects the movement of the object and determines whether a gambling event is to occur. In accordance with some embodiments of the invention, a gambling event is triggered by the alignment of three or more matching objects in a row and/or column. In other embodiments, the game world engine can detect any of a variety of triggering events appropriate to the requirements of a specific application. To resolve the gambling event, the game world engine requests that the real world engine determine the result of the gambling event and associated wagers (1512). The real world engine determines the results of the gambling event and any associated wagers by the player (1515). The results of the gambling event are then provided by the real world engine to the game world engine (1520) and the results of any wagers are displayed to the player.

The game world engine obtains the results of the gambling event and associated wagers from the real world engine; and the results of the movement of the object from the entertainment engine. From the results of the gambling event and the game play, the game world engine determines an amount of quanta to award the player (1525). If quanta is awarded (1530), the amount of quanta awarded, and/or the total amount of quanta possessed by the player are displayed (1535). Regardless of the award of quanta, game play of the object alignment game is continued by the entertainment engine (1540). During game play, quanta options may be made available (1545) to the player. For purposes of this discussion, quanta options are options for a player to use an amount of quanta to change a game parameter. For example, a certain amount of quanta may be used to change a certain number of objects in the grid to different types of object, to change the orientation of the gird or effect the amount of points award for each alignment of matching objects. One skilled in the art will recognize that these are only examples and other changes to the game parameters of the object alignment game may be offered without departing from embodiments of the invention.

If the player selects a quanta option (1550), the amount of the option is deducted from the quanta total of the player. The game parameters are changed according to the option selected and the updated quanta total is displayed for the player (1535). The game play of the object alignment game continues (1540) with the changed parameters.

Figure 16:
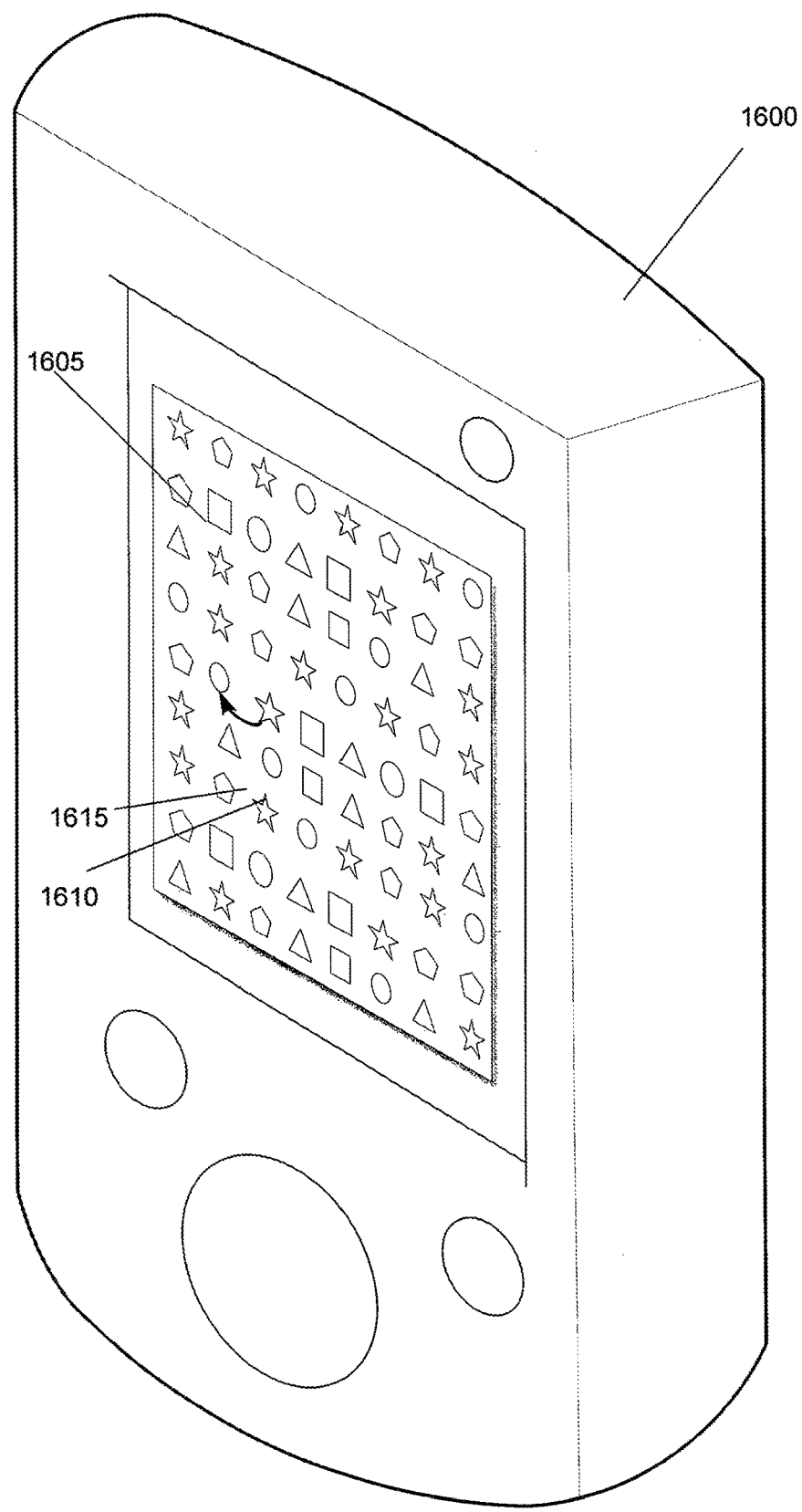
FIG. 16 illustrates a front view of a mobile device providing a gambling hybrid game with an object alignment game as an entertainment game in accordance with embodiments of the invention.

A gambling hybrid game having an object alignment entertainment game provided by a mobile electronic device in accordance with embodiments of the invention is shown in FIG. 16. As illustrated in FIG. 16, mobile device 1600 has a display of an object alignment entertainment game including a grid 1605 of objects 1610. In FIG. 16 each object 1610 is a gem of a particular color and/or shape. The player moves an object 1610 as indicated by arrow 1615 to cause alignment of the object with matching objects along a column of grid 1600.

Figure 17:
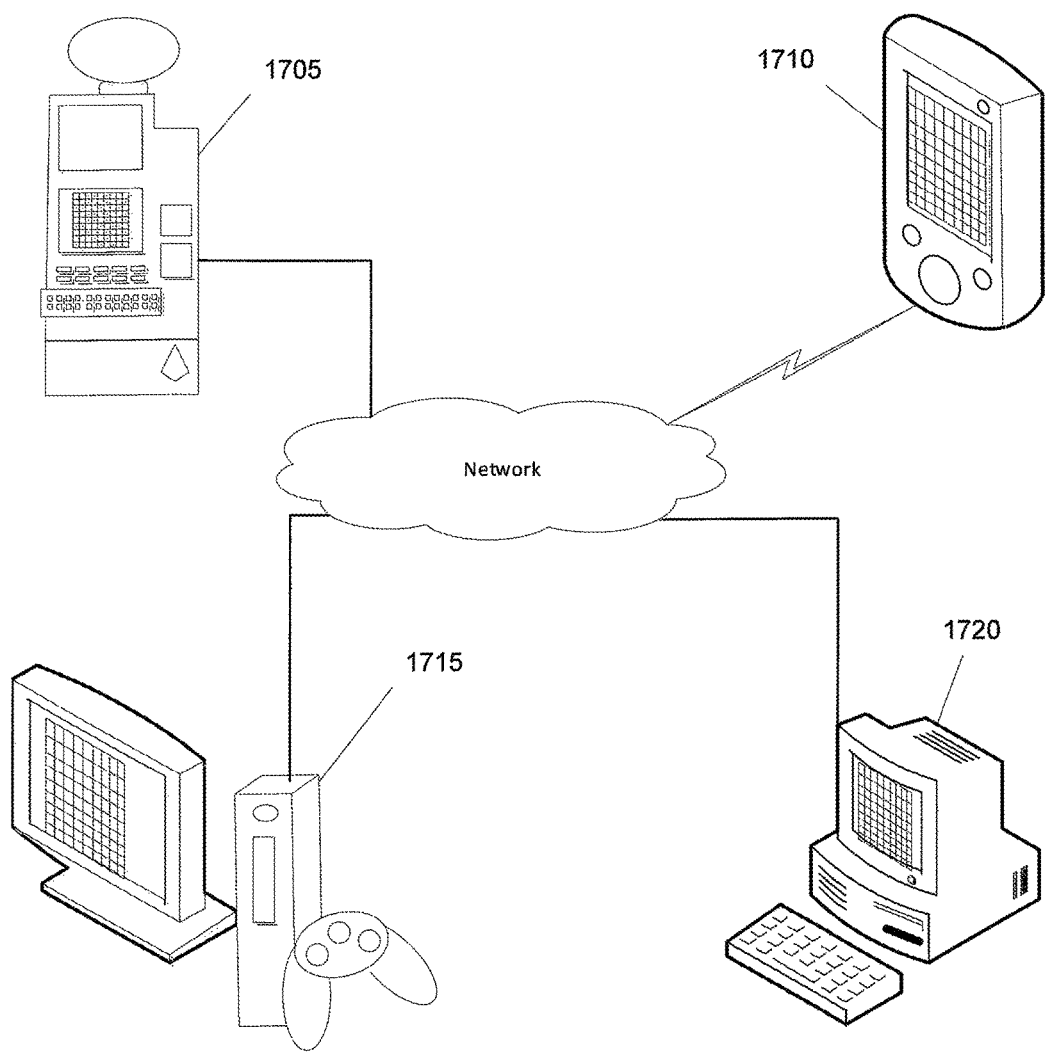
FIG. 17 illustrates different devices providing gambling hybrid games with object alignment entertainment games in accordance with embodiments of the invention.

Various devices that provide a gambling hybrid game having an object alignment entertainment game in accordance with embodiments of the invention are show connected to a network in FIG. 17. The gambling hybrid gaming system may be deployed as an electronic game on a variety of hosts. For example, the gambling hybrid gaming system may be deployed on a gaming cabinet 1705 as used in a traditional land-based casino. The gambling hybrid gaming system may be deployed on a mobile computing device 1710 such as, but not limited to, a Personal Digital Assistant (PDA), smartphone, tablet computer, laptop computer, etc. The gambling hybrid gaming system may also be deployed on a game console 1715, such as, but not limited to, an XBox™, Playstation™, etc. The gambling hybrid gaming system may also be deployed on a Personal Computer (PC) 1720 or other computing system. Each of the hosts may be operatively connected to other hosts via a network. Furthermore, each of the hosts may also be further operatively connected to other types of systems and hosts as previously described herein.

Figure 18:
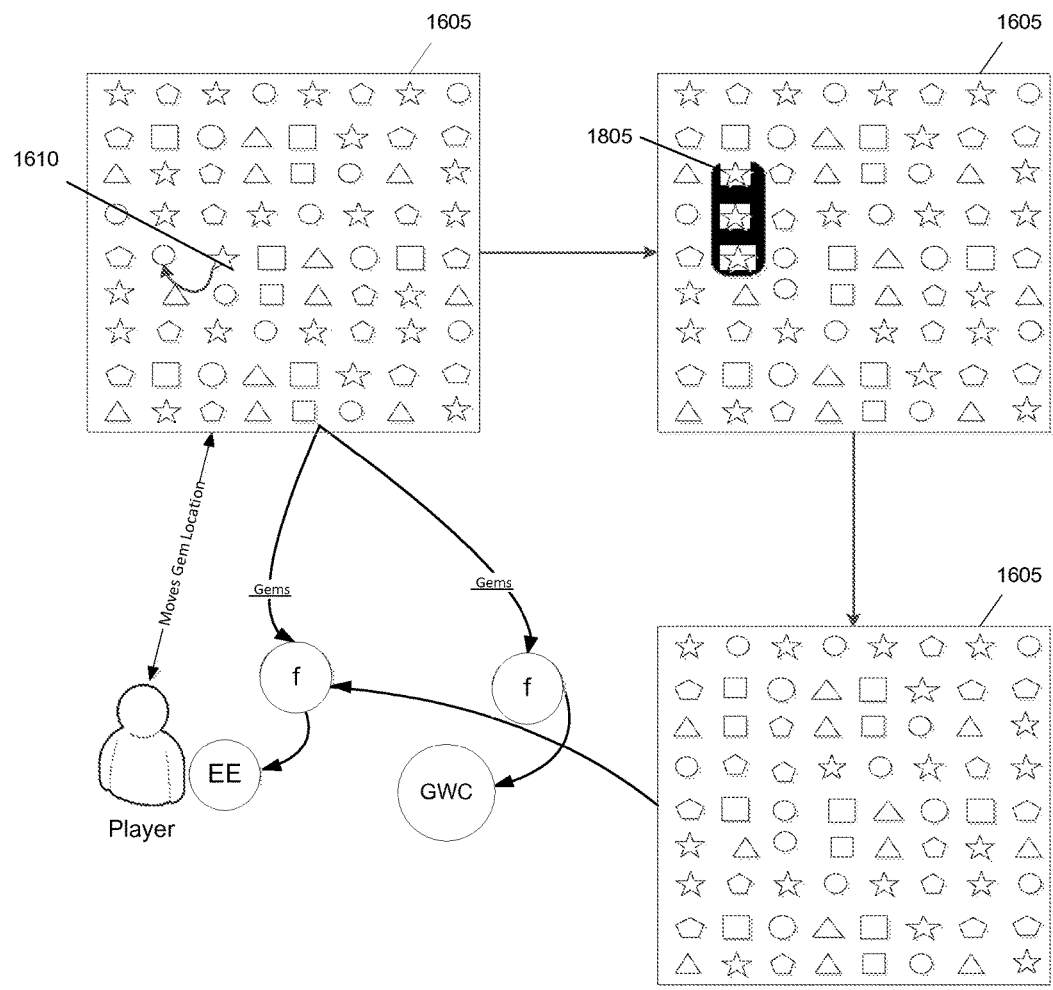
FIG. 18 illustrates a conceptual diagram of a process for awarding a player for based on a gambling event and game play in a gambling hybrid game having an object alignment game as an entertainment game in accordance with embodiments of the invention

A conceptual view of the provision of a gambling hybrid game having an object alignment game as an entertainment game in accordance with embodiments of the invention is shown in FIG. 18. During gameplay of the object alignment game, a player is presented with a grid 1605 of objects 1610. Each object is one of a certain number of types. As illustrated in FIG. 18, the ultimate goal is for the player to align at least a certain number of matching objects 1610 in a row and/or column in the grid 1600. The aligned matching objects 1805 in the grid 1600 are then replaced by different objects 1605 and gameplay continues until either a certain number of matches are made or a time period expires. As the player aligns various matching objects, the player is awarded points for the alignment and additional jewels are added to the top of the grid of objects that as illustrated in FIG. 18. In variants of the games (e.g. Butterflies, Diamond Mine, etc.), special features provide additional complexity to the game play. For example, in "Butterflies", a player has to release the butterflies and prevent them from migrating to the top of the game board where they can be consumed by a spider. In "Diamond Mine", the player competes against the clock to dig a mine while creating rows of jewels, "L" shaped jewel patterns or "T" shaped jewel patterns among other things.

In the accordance with embodiments of the invention, the EE of an object alignment game can take on one or more forms in various implementations. In accordance with embodiments where the player is playing against a game- or real-time-clock, the EE can be, but is not limited to, one or more increment(s) of unit time. In accordance with embodiments where the game play is based on a number of moves, the EE can be, but is not limited to, each move, i.e. a swap of jewels and/or the activation of Hypercubes. In accordance with some embodiments, the actions that are EE can also be and/or alternatively be characterized as AE. The EE can also be a range of items or actions that may or may not be available at the onset of a game and/or level including, but not limited to, the deployment of star gems, special gems, time gems, the ability to reset the game board, and the ability to reshuffle the game board.

In accordance with some embodiments of the invention, a player screen displays a measure of quanta available to the player and a library of entertainment game elements that the quanta may be used to obtain. In accordance with some embodiments, the entertainment game elements are obtained by using quanta to purchase the elements. Quanta corresponds to the success in the gambling game and may be modified by other game factors as described above.

Example of a Gambling Hybrid Game Having an Object Alignment Entertainment Game

One example of a gambling hybrid game having an object alignment entertainment game is a gambling hybrid game that provides a jewel alignment entertainment game similar to Bejeweled™. Play of the gambling hybrid game providing the jewel alignment entertainment game begins with a player entering RC into the machine. A minimum amount of RC is required by the casino or other type of provider to enable play. The player then sets the denomination by selecting how much RC to allocate to each type of EE in the game. The relative value of each EE type is set as function of the gambling hybrid game in accordance with some of these embodiments, Alternatively, the relative value of EE types is set independently for each type of EE by the player in accordance with some other embodiments. For example, the following table shows the relative value of each type of EE as follows in an embodiment where the relative value of various EE types is set by as a function of the gambling hybrid game.

| EE Type | Relative Value |
| --- | --- |
| Jewel swap | 1 |
| Hypercube activation | 2 |
| Reshuffle the game board | 4 |
| Receive hint showing highest point value move | 4 |
| Shift all butterflies down one row | 3 |
| Add 10 time units to the game clock | 3 |
| Replace any gem on board with a star gem | 5 |

One skilled in the art will note that not all types of EE shown may be available in any given embodiment of a gambling hybrid game, and other types of EE not listed may also be included without departing from these embodiments. A number of these types of EE may also only be acquirable by consuming Quanta that the player has earned, and the consumption of the EE so acquired may or may not cause the commitment of player RC to a gambling game.

The player then sets the amount of credits to assign to each type of EE by setting a base denomination. For example, the player sets a base denomination of $0.25. The following table show the value of each EE type as relates to initiating gambling games in which the base denomination is $0.25:

| EE Type | Relative Value | EE Value (RC) |
| --- | --- | --- |
| Jewel swap | 1 | $0.25 |
| Hypercube activation | 2 | $0.50 |
| Reshuffle game board | 4 | $1.00 |
| Add 10 time units | 3 | $0.75 |
| Replace any gem | 5 | $1.25 |

Each EE has a different pay table associated with the particular EE, and the pay tables information is described to the player in general or specific terms as part of a set up process or introductory screens in accordance with some embodiments of this gambling hybrid game. The information may also be available at all times through a drop-down or pull-up display of "info", a separate physical display, a graphical overlay or other user interface in accordance with some of these or other embodiments of this gambling hybrid game.

In accordance with some embodiments, a "Jewel Swap" is an AE not an EE, in so far as there need not be an explicit limit on the number of jewel swaps a player can affect during game play. However, the number of "Jewel Swaps" is limited by available RC to gamble as a function of AE-based triggers in accordance with some embodiments.

Once the base denomination is set, the player commences play. If the player has played the game before, the player may have the ability to select one of a multitude of levels to play as a function of information stored in a player account of the particular player. In accordance with some embodiments, the player commences play at a prescribed level. Players that demonstrate exceptional skill may also be exposed to specific "bonus" levels with enhanced game play (in terms of the entertainment and/or gambling game play).

The player plays the game by swapping the position of jewels within a prescribed game board or grid. In accordance with one embodiment, each time the player swaps jewels, (EE) is consumed (i.e. a limited number of swaps are afforded the player), and a wager corresponding to the EE Value on a gambling event based on the swap is initiated in the RWE, and the player's RC is reduced accordingly. The outcome of the gambling and associated wager may cause RC to increase and may cause an accumulation of Quanta. In accordance with some other embodiments, the number of jewel swaps is limited by the arrangement of the jewels in the grid at the onset of play, as well as the successive replacement of jewels as jewels are removed due to player actions. In accordance with these embodiments, the limited amount of EE available is not described to the player as a "limited number of swaps afforded the player".

Figure 19:
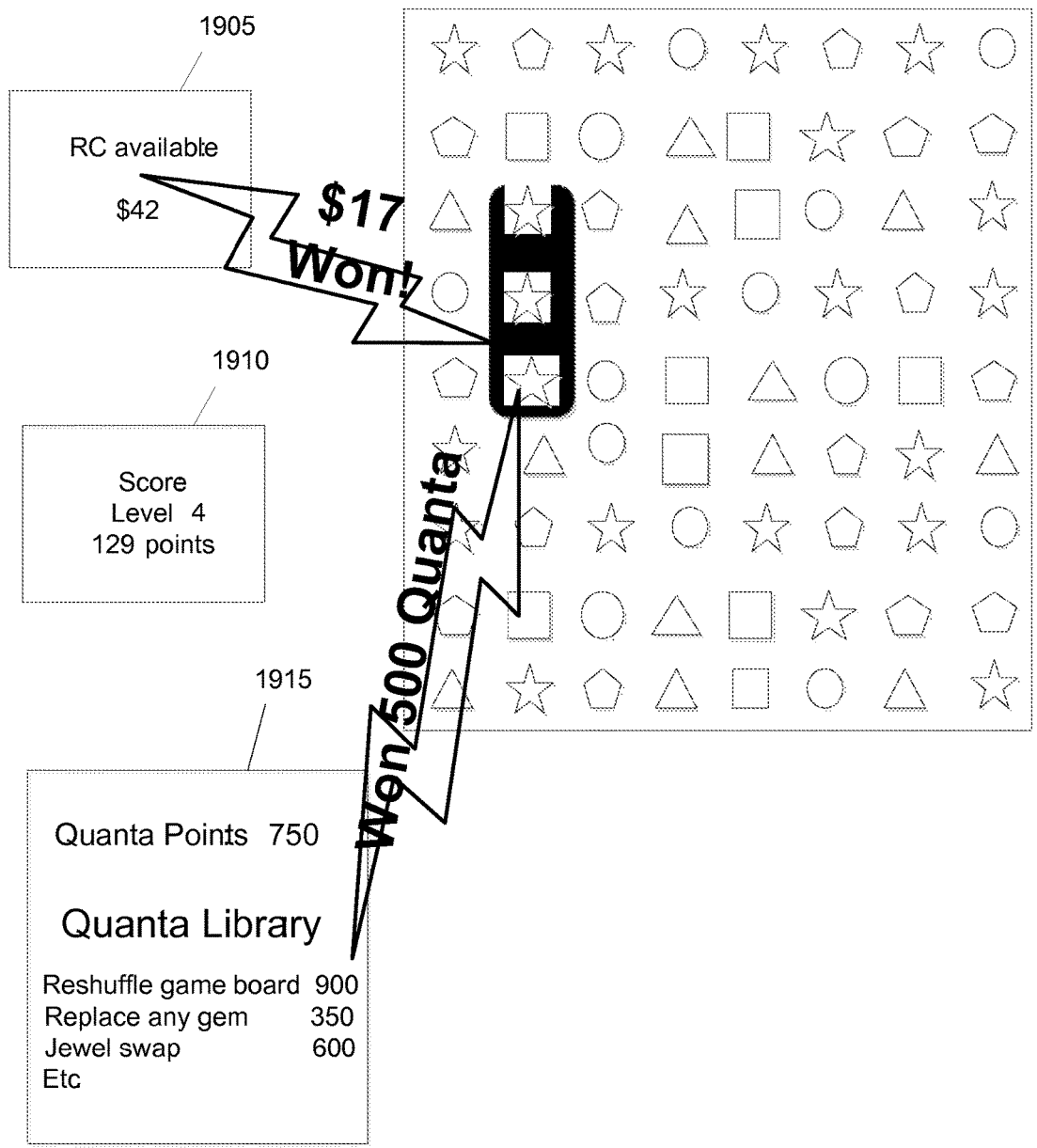
FIG. 19 illustrates a conceptual diagram of actions that occur in a gambling hybrid game that has an object alignment game as an entertainment game in accordance with embodiments of the invention.

A player screen displaying GWC, Quanta, and a library of elements available to be purchased via Quanta (e.g. reshuffle game board, replace any gem, jewel swap, etc.) in accordance with embodiments of the invention is illustrated in FIG. 19. The RC available is displayed in an RC account display 1905. A score display 1910 displays the player GWC earned during the game. The quanta available to a player and library of elements are provided to the player in quanta display 1915.

The GWC displayed in score display 1910 corresponds to the effectiveness with which the player creates rows, L's or T's of jewels, and other measures of performance normally associated with the entertainment game version of Bejeweled™ or other jewel alignment entertainment game. The use of entertainment elements purchased using Quanta may or may not impact GWC, and the impact may or may not be the same as would be for the deployment of entertainment element or elements if the entertainment elements had not been acquired using Quanta.

The amount of quanta available to a player and a library of EE available for purchase using the quanta are provided in quanta display 1915. In accordance with embodiments of this gambling hybrid game, a player can convert quanta into any of the EE provided in the library. One skilled in the art will note that the EE listed in the library are meant to be an illustrative, not exhaustive list of options. Each of the EE has a set "price" in terms of quanta. Furthermore, each EE has a specific limit as to the number of times that the EE may be purchased either on a per game, a per period of game time, per elapsed time, or per other limited basis in accordance with some of these embodiments. The game may also have one or more limits as to the frequency with which a specific EE may be purchased (i.e. no more than once per level; no more than once per 30 "ticks" of game time; or no more than once per 20 minutes of real time) in accordance with some of these embodiments.

The RC available for gambling play in the gambling hybrid game is displayed in RC display 1905. If a player runs out of RC during play of the gambling hybrid game, more RC can be entered into the machine before additional EE can be consumed or AE undertaken in accordance with some embodiments. In accordance with other embodiments, the game can still be played if a player runs out of RC. However, game play continues in a non-gambling mode and/or a virtual currency mode. In accordance with some embodiments, one or more of the above Quanta purchasable elements may also be able to be purchased outright using RC during or before game play.

During game play of the jewel alignment game, the player is shown how much RC will be committed to the gambling game when a "Jewel Swap" is undertaken. The player may opt for confirmation of each and every wager on a gambling event before the gambling event is processed, or for a blanket acceptance of RC committed to a gambling event until one or more conditions are met (i.e. total RC committed, total RC lost, etc.). In accordance with some embodiments that player may also opt to have a blanket acceptance in place without any conditions. The player can select the options during a set up process, through a control element available at all times on the screen or through a pop-up dashboard in accordance with embodiments of the gambling hybrid game. When a player elects to consume an EE (such as shifting all butterflies down one row) that have been acquired using quanta or in some other manner, the amount of RC to be committed to the gambling game is displayed in accordance with some embodiments. The player can then confirm the amount of RC committed based upon settings established by the casino, another provider, and/or the player in accordance with these embodiments. When the player affects a "Jewel Swap", the amount of RC committed to a wager on a gambling event based upon completion of the swap can be shown in close proximity to the swap or in a pre-defined display area on the screen (or an auxiliary screen).

The gambling event is then executed in the RWE as the "Jewel Swap" in the jewel alignment entertainment game is completed. The RC committed to a wager associated with the gambling event is decremented from the player's RC account as displayed in the game for the gambling event. The results of the gambling event are communicated to the player prior to, coincidentally with, or subsequent to the evaporation of the column, row, L, or T alignment of jewels and assignment of GWC in response to the "Jewel Swap" in accordance with embodiments of the invention. One skilled in the art will recognize that a similar mechanism is deployed relative to the consumption of other forms of EE or the occurrence of AE.

In accordance with some embodiments of the invention, the game can be constructed so that there are skill-based levels and gambling hybrid levels interspersed in the play of the jewel alignment entertainment game i.e. players port from one type of level to another based on various occurrences in the base skill game, etc.

In accordance with some embodiments of these gambling hybrid games, quanta persists from one level of play to the next, but not beyond a single game session. In accordance with other embodiments, the amount of Quanta is reset each level. In accordance with still other embodiments, Quanta persists across not only multiple levels, but across multiple game play sessions.

In accordance with embodiments of gambling hybrid games having object alignment entertainments games, tournament entry is managed in accord with other gambling hybrid game systems. Tournament entry may be based, different factors including, but not limited to, GWC accumulated independent or dependent upon RC committed/won/lost in gambling events. Furthermore, tournament entry may or may not take into account player skill as determined in a single game session or across multiple game sessions in accordance with these embodiments.

In accordance with other embodiments, tournament entry is achieved as a function of a gambling event result, or a result that spans multiple gambling events in a gambling game within the gambling hybrid game framework. For example, in the "Mining" variant of a gambling hybrid game having a jewel alignment entertainment game, players accumulate treasures as the jewel alignment game is played. A specific treasure (e.g. a gold crown) could act as a token that gains the player entry to a specific tournament or to one of a number of tournaments (as opposed to a specific tournament).

In accordance with other embodiment of gambling hybrid games having object alignment entertainment games, players are exposed to special bonus features (i.e. in game objects or variables) and awards (i.e. RC based or real goods; and/or services) that may be gained through "skill" but are made available as a function of either skill performance and/or gambling game performance. For example, a player wins a "mega jackpot" based on the pay table of the row of jewels she most recently eliminated from the board. The "mega jackpot" is a "magic jewel" that replaces one of the standard jewels on the game board. If and when this jewel is removed from the board as part of a 3-jewel combination the player (a skill event) gains $1000 worth of RC. The inclusion of this jewel in a 3-jewel combination may be advanced by the conversion of Quanta into enhancements that the player can use.

Although certain specific features and aspects of a gaming system have been described herein, many additional modifications and variations would be apparent to those skilled in the art. For example, the features and aspects described herein may be implemented independently, cooperatively or alternatively without deviating from the spirit of the disclosure.

It is therefore to be understood that gaming system may be practiced otherwise than as specifically described. Thus, the foregoing description of the gaming system should be considered in all respects as illustrative and not restrictive, the scope of the claims to be determined as supported by this disclosure and the claims' equivalents, rather than the foregoing description.

What is claimed is:

1. A gambling hybrid gaming system, comprising:
a controller constructed to:
provide an entertainment game and present the entertainment game to a player wherein the entertainment game is an object alignment game in which the player moves an object in a displayed grid to form an alignment of a plurality of matching objects in a specified configuration;
receive an input from the player indicating a movement of the object in the entertainment game;
determine a result of the movement in the entertainment game;
generate a status update regarding play of the object alignment game;
communicate, to a game world server, the status update regarding play of the object alignment game;
receive, from the game world server, the result of a gambling event; and
present the result of the gambling event to the player;
a real world engine constructed to:
receive, from the game world server, instructions to execute the gambling event based on the status update;
determine the result of the gambling event;
communicate, to the game world server, the result of the gambling event; and
the game world server, connected to the controller via a controller and connected to the real world engine via communication link, constructed to:
manage the entertainment game executed by the controller;
receive, from the controller, the status update regarding play of the object alignment game;
determine whether the gambling event is to occur based upon the status update;
communicate, to the real world engine, instructions to execute the gambling event based on a determination of whether to execute the gambling event based on the status update;
receive, from the real world engine, the result of the gambling event; and
communicate, to the controller, the result of the gambling event.

2. The gambling hybrid gaming system of claim 1, wherein the game world server is constructed further to:
determine an amount of an intermediate value item to award the player based on the result of the gambling event.

3. The gambling hybrid gaming system of claim 2, wherein the game world server is constructed to:
use the status update along with the result of the gambling event to determine the amount of the intermediate value item to award.

4. The gambling hybrid gaming system of claim 2 wherein the game world server is further constructed to:
provide an indeterminate game resource that the player may acquire with the intermediate value item;
receive a request from the player to acquire the indeterminate game resource;
deduct the amount of the intermediate value item from the intermediate value item account of the player; and
provide an update of the indeterminate game resource to the entertainment game for use in the entertainment game.

5. The gambling hybrid gaming system of claim 1, wherein the game world server further is constructed to:
determine an amount of game world currency to provide to the player based on the result of the gambling event.

6. The gambling hybrid gaming system of claim 5, wherein the game world server is further constructed to:
provide an indeterminate game resource that the player may acquire with the game world currency;
receive a request from the player to acquire the indeterminate game resource;
deduct the amount of the game world currency from a game world currency account of the player; and
provide an update of the indeterminate game resource to the controller for use in the object alignment game.

7. The gambling hybrid gaming system of claim 1, wherein the communications link is the communications network.

8. A gambling hybrid gaming system, comprising:
a controller constructed to:
provide an entertainment game and present the entertainment game to a player wherein the entertainment game is an object alignment game in which the player moves an object in a displayed grid to form an alignment of a plurality of matching objects in a specified configuration;
receive an input from the player indicating a movement of the object in the entertainment game;
determine a result of the movement in the entertainment game;
generate a status update regarding play of the object alignment game;
communicate, to a game world server, the status update regarding play of the object alignment game;
receive, from the game world server, the result of the gambling event; and
present the result of the gambling event to the player; and
the game world server, connected to the controller via a controller and connected to a real world engine via communication link, constructed to:
manage the entertainment game executed by the controller;
receive, from the controller, the status update regarding play of the object alignment game;
determine whether the gambling event is to occur based upon the status update;
communicate, to the real world engine, instructions to execute the gambling event based on a determination of whether to execute the gambling event based on the status update;
receive, from the real world engine, the result of the gambling event; and
communicate, to the controller, the result of the gambling event.

9. The gambling hybrid gaming system of claim 8, wherein the game world server is constructed further to determine an amount of an intermediate value item to award the player based on the result of the gambling event.

10. The gambling hybrid gaming system of claim 9, wherein the game world server is constructed to:

use the status update along with the result of the gambling event to determine the amount of the intermediate value item to award.

11. The gambling hybrid gaming system of claim 9 wherein the game world server is further constructed to:
provide an indeterminate game resource that the player may acquire with the intermediate value item;
receive a request from the player to acquire the indeterminate game resource;
deduct the amount of the intermediate value item from the intermediate value item account of the player; and
provide an update of the indeterminate game resource to the entertainment game for use in the entertainment game.

12. The gambling hybrid gaming system of claim 8, wherein the game world server further is constructed to:
determine an amount of game world currency to provide to the player based on the result of the gambling event.

13. The gambling hybrid gaming system of claim 12, wherein the game world server is further constructed to:
provide an indeterminate game resource that the player may acquire with the game world currency;
receive a request from the player to acquire the indeterminate game resource;
deduct the amount of the game world currency from a game world currency account of the player; and
provide an update of the indeterminate game resource to the controller for use in the object alignment game.

14. The gambling hybrid gaming system of claim 8, wherein the communications link is the communications network.

15. A gambling hybrid gaming system, comprising:
a real world engine constructed to:
receive, from a game world server, instructions to execute a gambling event based on a status update;
determine a result of the gambling event;
communicate, to the game world server, the result of the gambling event; and
the game world server, connected to a controller via a controller and connected to the real world engine via communication link, constructed to:
manage an entertainment game executed by the controller;
receive, from the controller, the status update regarding play of an object alignment game;
determine whether the gambling event is to occur based upon the status update;
communicate, to the real world engine, instructions to execute the gambling event based on a determination of whether to execute the gambling event based on the status update;
receive, from the real world engine, the result of the gambling event; and
communicate, to the controller, the result of the gambling event.

16. The gambling hybrid gaming system of claim 15, wherein the game world server is constructed further to:
determine an amount of an intermediate value item to award a player based on the result of the gambling event.

17. The gambling hybrid gaming system of claim 16, wherein the game world server is constructed to:
use the status update along with the result of the gambling event to determine an amount of the intermediate value item to award.

18. The gambling hybrid gaming system of claim 16 wherein the game world server is further constructed to:
provide an indeterminate game resource that the player may acquire with the intermediate value item;
receive a request from the player to acquire the indeterminate game resource;
deduct the amount of the intermediate value item from an intermediate value item account of the player; and
provide an update of the indeterminate game resource to the entertainment game for use in the entertainment game.

19. The gambling hybrid gaming system of claim 15, wherein the game world server further is constructed to:
determine the amount of game world currency to provide to the player based on the result of the gambling event.

20. The gambling hybrid gaming system of claim 19, wherein the game world server is further constructed to:
provide an indeterminate game resource that the player may acquire with the game world currency;
receive a request from the player to acquire the indeterminate game resource;
deduct the amount of the game world currency from a game world currency account of the player; and
provide an update of the indeterminate game resource to the controller for use in the object alignment game.

21. The gambling hybrid gaming system of claim 15, wherein the communications link is the communications network.

* * * * *